United States Patent
Nagai et al.

(10) Patent No.: US 7,193,390 B2
(45) Date of Patent: Mar. 20, 2007

(54) APPARATUS FOR CONNECTING SECONDARY BATTERY CELLS IN SERIES AND METHOD FOR CONTROLLING SECONDARY BATTERY CELLS CONNECTED IN SERIES

(75) Inventors: Tamiji Nagai, Kanagawa (JP); Kazuo Yamazaki, Kanagawa (JP); Tamon Ikeda, Tokyo (JP)

(73) Assignee: Sony Corporation (JP)

( * ) Notice: Subject to any disclaimer, the term of this patent is extended or adjusted under 35 U.S.C. 154(b) by 504 days.

(21) Appl. No.: 10/426,650

(22) Filed: May 1, 2003

(65) Prior Publication Data

US 2004/0018397 A1    Jan. 29, 2004

(30) Foreign Application Priority Data

May 17, 2002    (JP)    ............................ P2002-142883

(51) Int. Cl.
*H02J 7/00*    (2006.01)

(52) U.S. Cl. .................. 320/116; 320/103; 320/119; 320/166

(58) Field of Classification Search ................ 320/103, 320/116, 119

See application file for complete search history.

(56) References Cited

U.S. PATENT DOCUMENTS 6,157,165 A * 12/2000 Kinoshita et al. ........... 320/116

* cited by examiner

*Primary Examiner*—Karl Easthom
*Assistant Examiner*—Samuel Berhanu
(74) *Attorney, Agent, or Firm*—Rader Fishman & Grauer PLLC; Ronald P. Kananen

(57) ABSTRACT

When an output voltage of a secondary battery cell E1 is obtained, only SW1 and SW2 are turned on. As a result, a capacitor C1 is charged by a secondary battery cell E1. With a delay of a time period ÄT, SW1 and SW2 are turned off. SW4 and SW5 are turned on. As a result, electric charges of the capacitor C1 are moved to a capacitor C2. Those operations are repeated until the potential of the capacitor C2 becomes almost equal to the output voltage of the secondary battery cell E1. When the potential of the capacitor C2 becomes almost equal to the output voltage of the capacitor C2, the potential of the capacitor C2 is detected by the voltage detector 11. A first terminal of the capacitor C2 is connected to a ground potential. As a result, the voltage of the secondary battery cell E1 can be stably detected. When the secondary battery cell E2 is detected, only SW5 is turned on. As a result, the capacitor C2 is charged by the secondary battery cell E2. The potential of the capacitor C2 is detected by the voltage detector 11. The voltage detector 11 is used in common with the secondary battery cells E1 and E2. As a result, fluctuations of detected results can be prevented. In addition, using that method, a circuit power can be supplied by the capacitor C2.

7 Claims, 19 Drawing Sheets

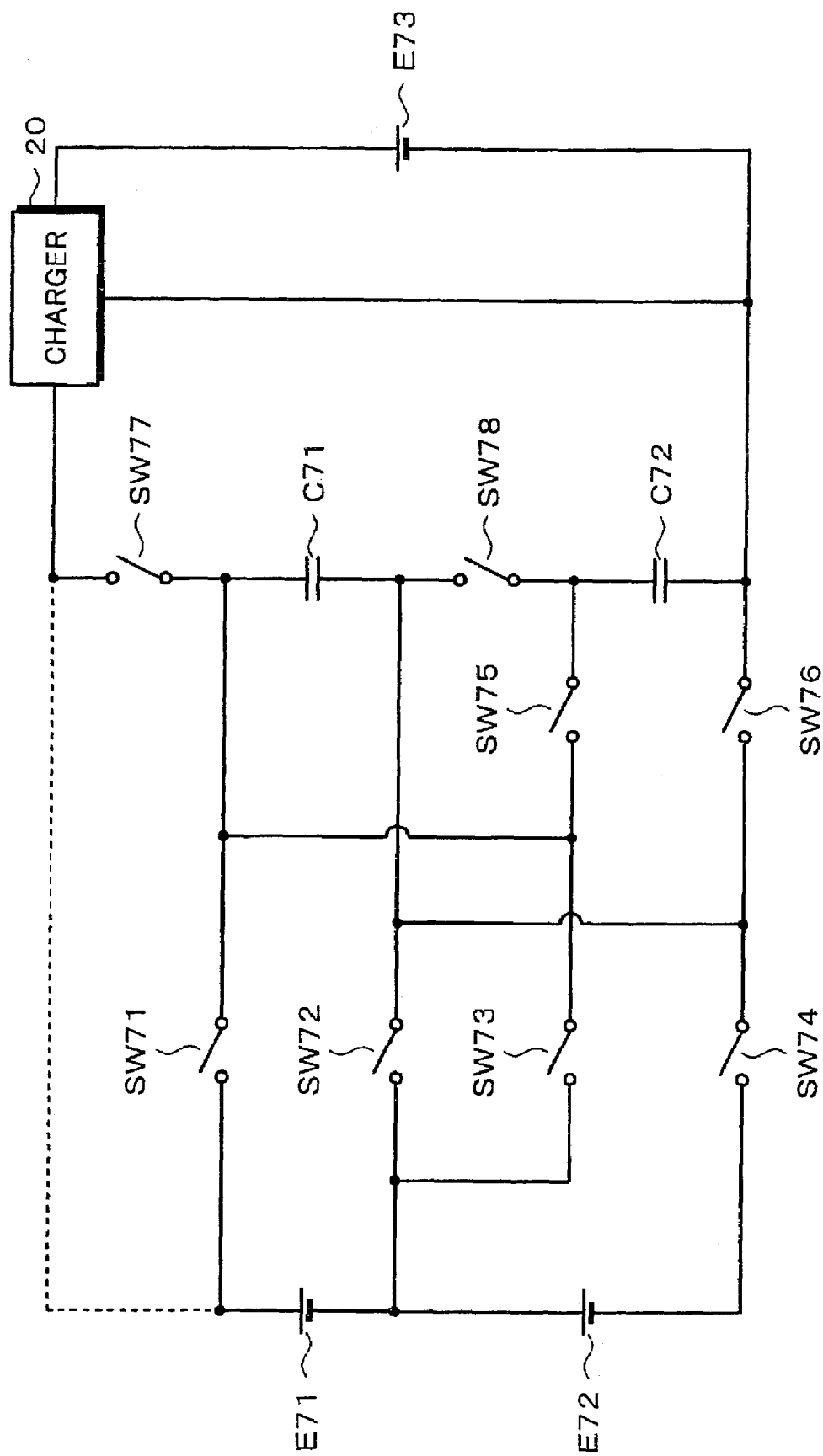

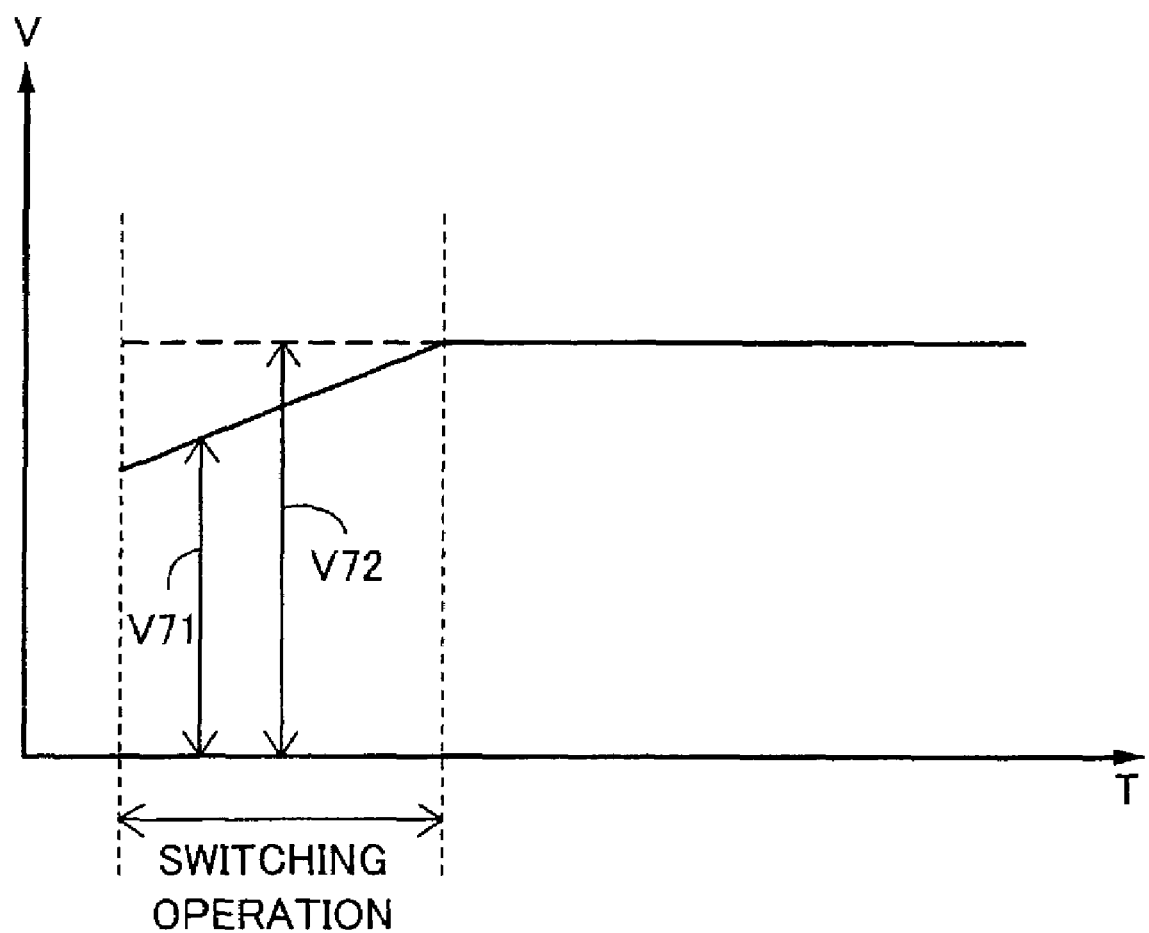

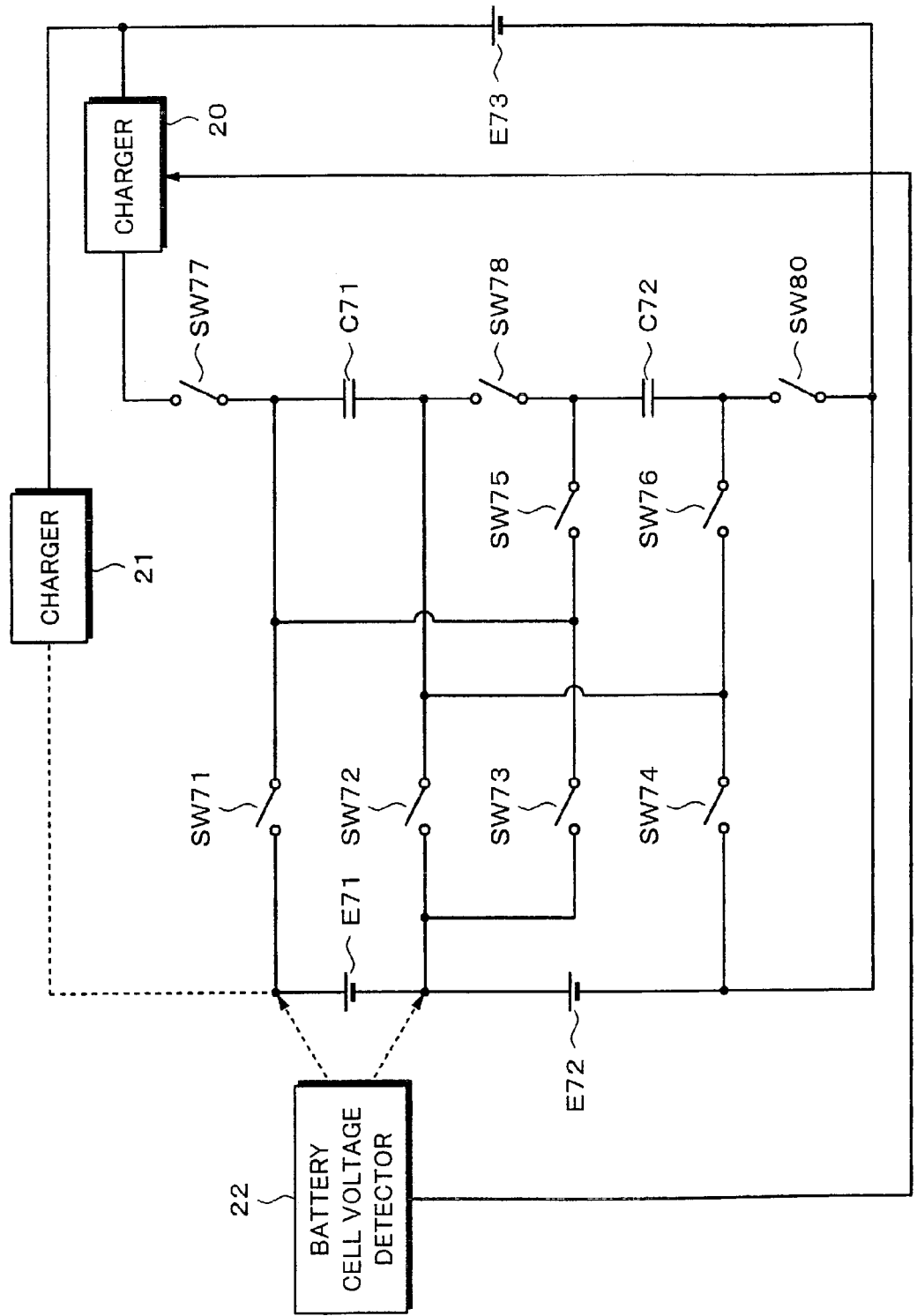

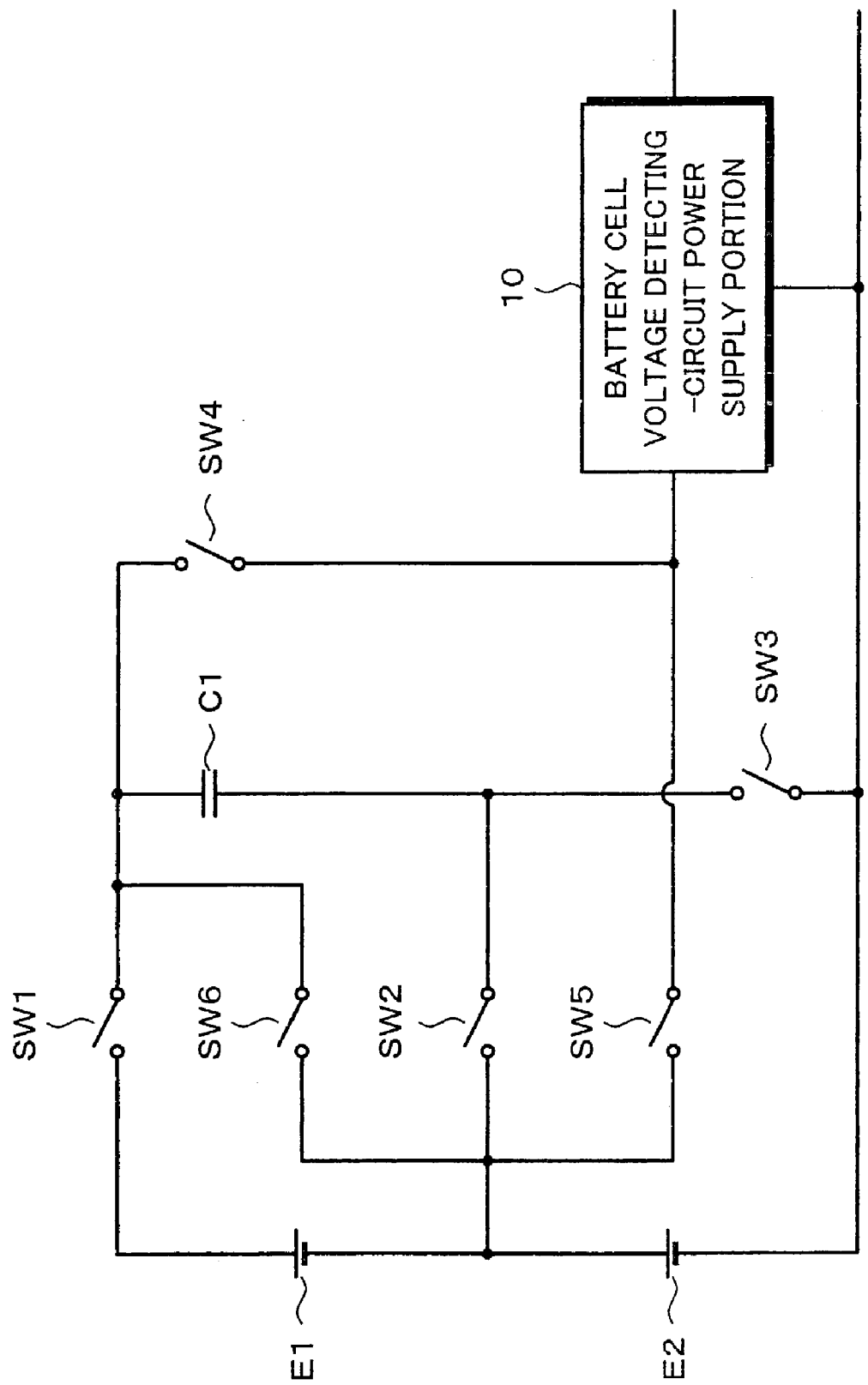

APPARATUS FOR CONNECTING SECONDARY BATTERY CELLS IN SERIES AND METHOD FOR CONTROLLING SECONDARY BATTERY CELLS CONNECTED IN SERIES

BACKGROUND OF THE INVENTION

1. Field of the Invention

The present invention relates to an apparatus for connecting secondary battery cells in series and a method for controlling secondary battery cells in series so as to properly control them.

2. Description of the Related Art

In recent years, as portable telephone terminal units, audio reproducing units, note type personal computer have become common, rechargeable secondary battery cells have become important. In addition, as such portable units have provided high performances, their power consumptions increase. Thus, there have been needs for secondary battery cells that have higher power outputs for longer time than before. Nevertheless, the secondary battery cells structurally have their maximum voltages. Consequently, when a higher voltage is required, several to several ten secondary battery cells are connected in series.

In recent years, lithium type battery cells such as lithium ion battery cells and polymer lithium battery cells have become the mainstream of secondary battery cells.

When secondary battery cells that are connected in series are used, as the power is consumed, the battery cell capacities are worn out. As a result, output voltages of the connected battery cells may become different and the battery cells may become unbalanced. When battery cells are connected in series, the positive electrode of one battery cell is connected to the negative electrode of the next battery cell. However, when the battery cells become unbalanced, a reverse charging takes place from one battery cell that has a higher voltage to another battery cell that has a lower voltage. In other words, a charging takes place with opposite electrodes. Thus, if battery cells are kept in the unbalanced state, the reverse charging may endanger the battery cell that has the lower voltage.

In addition, if secondary battery cells that are connected in series are charged in the unbalanced state, a trouble will take place. Now, it is assumed that a battery pack that contains two secondary battery cells having a capacity of 4.2 V each connected in series is charged. In addition, it is assumed that the output voltage of one secondary battery cells drops to 4.0 V. In the case, the output voltage of the other secondary battery cell is still 4.2 V. Thus, the output voltage of the battery pack is 8.2 V.

A charger charges the battery pack for 0.2 V so that the output voltage thereof becomes 8.4 V. As a result, the two secondary battery cells are charged for 0.1 V each. In other words, the secondary battery cell whose output voltage has dropped and the secondary battery cell whose output voltage has not dropped are charged at 4.1 V and 4.3 V, respectively. Thus, since the other battery cell is overcharged against the regular capacity of 4.2 V, it may become endangered.

To prevent the battery cells from becoming unbalanced, it is necessary to detect the voltages of the secondary battery cells that are connected in series and keep the secondary battery cells balanced corresponding to the detected voltages. As one method, the voltages of secondary battery cells that are connected in series can be separately detected. As another method, the voltages of secondary battery cells are measured at more than two points and calculated by a calculation.

FIG. 1 shows an example of a structure of which the voltages of secondary battery cells that are connected in series are separately detected and the battery cells are balanced. Referring to FIG. 1, secondary battery cells E100 and E101 are connected in series. The voltages of those secondary battery cells E100 and E101 are detected by detecting circuits 100 and 101, respectively. The detected results are supplied to a controlling circuit 103. Discharging circuits 104 and 105 discharge the secondary battery cells E100 and E101 under the control of the controlling circuit 103. A power source of the controlling circuit 103 is obtained by a voltage down circuit 102. The voltage down circuit 102 drops the output voltages of the secondary battery cells E100 and E101, which are connected in series, to predetermined voltages. The voltage down circuit 102 also stabilizes the voltages.

In the structure shown in FIG. 1, the voltages of the secondary battery cells E100 and E101 are detected by the detecting circuits 100 and 101, respectively. The secondary battery cells E100 and E101 are discharged by the discharging circuits 104 and 105, respectively, under the control of the controlling circuit 103 corresponding to the detected results. As a result, the secondary battery cells E100 and E101 are balanced.

In the method, while the secondary battery cells E100 and E101 are being discharged, they are balanced. Thus, it takes a long time until the secondary battery cells become balanced.

In addition, since the voltage down circuit 102 drops the output voltage of which the secondary battery cells E100 and E101 are connected in series to a predetermined voltage and supplies the dropped voltage to the controlling circuit 103, a large loss takes place.

Moreover, there is also a problem about detected voltages of the secondary battery cells E100 and E101. FIG. 2 is an enlarged view showing the voltage detecting portions of FIG. 1. In the conventional method, two voltage detecting circuits namely the detecting circuits 100 and 101 are used. Thus, the detection characteristics of the detecting circuits 100 and 101 deviate. As a result, the discharging of the secondary battery cells E100 and E101 cannot be accurately controlled by the controlling circuit 103.

In addition, in the method, when the voltage of the secondary battery cell E100 is detected, the detected portion departs from the ground potential. Thus, in the state that the voltage of the secondary battery cell E101 is added, the voltage of the secondary battery cell E100 is detected. As a result, the detected result contains an error.

To prevent such an error, it is possible to measure the output voltages of the secondary battery cells E100 and E101 with a single detecting circuit. FIG. 3 shows a structure in the case that a single detecting circuit is used. When the voltage of the secondary battery cell E100 is detected, SW100 and SW102 are turned on. SW101 and SW103 are turned off. When the voltage of the secondary battery cell E101 is detected, SW101 and SW103 are turned on. SW100 and SW102 are turned off. When those switches are controlled in such a manner, the single detecting circuit 102 can detect the voltages of the secondary battery cells E100 and E101.

However, like the structure shown in FIG. 2, in the method shown in FIG. 3, when the voltage of the secondary battery cell E100 is detected, the detected portion departs from the ground potential. In the state that the voltage of the secondary battery cell E101 is added, the voltage of the secondary battery cell E100 is detected. As a result, the detected result contains an error.

OBJECTS AND SUMMARY OF THE INVENTION

Therefore, an object of the present invention is to provide an apparatus for connecting secondary battery cells in series and a method for controlling secondary battery cells connected in series so that secondary battery cells connected in series are properly controlled.

One aspect of the present invention is an apparatus for connecting a first secondary battery cell and a second secondary battery cell in series, comprising first connecting means for connecting the first secondary battery cell and a first capacitor in parallel, a first electrode of the first secondary battery cell not being connected to a ground potential, and second connecting means for connecting the first capacitor and a second capacitor in parallel, a first terminal of the second capacitor being connected to the ground potential, wherein a voltage is taken out of the second capacitor.

Another aspect of the present invention is a method for controlling a first secondary battery cell and a second secondary battery cell that are connected in series, comprising the steps of connecting the first secondary battery cell and a first capacitor in parallel, a first electrode of the first secondary battery cell not being connected to a ground potential, and connecting the first capacitor and a second capacitor in parallel, a first terminal of the second capacitor being connected to the ground potential, wherein a voltage is taken out of the second capacitor.

Another aspect of the present invention is an apparatus for connecting a first secondary battery cell and a second secondary battery cell in series, comprising first connecting means for connecting the first secondary battery cell and a capacitor in parallel, second connecting means for connecting the second secondary battery cell and the capacitor in parallel, and third connecting means for connecting a first terminal of the capacitor to a ground terminal, wherein while the first terminal of the capacitor is connected to the ground terminal by the third connecting means, a voltage is taken out of the capacitor.

Another aspect of the present invention is a method for connecting a first secondary battery cell and a second secondary battery cell that are connected in series, comprising the steps of connecting the first secondary battery cell and a capacitor in parallel, connecting the second secondary battery cell and the capacitor in parallel, and connecting a first terminal of the capacitor to a ground terminal, wherein while the first terminal of the capacitor is connected to the ground terminal at the third connecting step, a voltage is taken out of the capacitor.

Another aspect of the present invention is an apparatus for connecting a first secondary battery cell and a second secondary battery cell in series and for charging the first secondary battery cell and the second secondary battery cell, comprising first connecting means for connecting a charging power supply and a capacitor in parallel, a first terminal of the capacitor being connected to a ground potential, and second connecting means for connecting one selected from the first secondary battery cell and the second secondary battery cell and the capacitor in parallel, wherein the charging power supply and the capacitor are connected in parallel by the first connecting means, the capacitor is charged by the charging power supply, the charging power supply is disconnected from the capacitor, the selected secondary battery cell and the capacitor are connected in parallel by the second connecting means, and the selected secondary battery cell is charged by the capacitor.

Another aspect of the present invention is a method for controlling a first secondary battery cell and a second secondary battery cell connected in series and for charging the first secondary battery cell and the second secondary battery cell, comprising the steps of connecting a charging power supply and a capacitor in parallel, a first terminal of the capacitor being connected to a ground potential, and connecting one selected from the first secondary battery cell and the second secondary battery cell and the capacitor in parallel, wherein the charging power supply and the capacitor are connected in parallel at the first connecting step, the capacitor is charged by the charging power supply, the charging power supply is disconnected from the capacitor, the selected secondary battery cell and the capacitor are connected in parallel at the second connecting step, and the selected secondary battery cell is charged by the capacitor.

As described above, according to the present invention, a first secondary battery cell and a first capacitor are connected in parallel. A first electrode of the first secondary battery cell is not connected to a ground potential. The first capacitor and a second capacitor are connected in parallel. A first terminal of the second capacitor is connected to the ground potential. A voltage is taken out of the second capacitor. Thus, a voltage corresponding to the output voltage of the secondary battery cell connected to the first capacitor in parallel can be stably obtained.

In addition, according to the present invention, a first secondary battery cell and a capacitor are connected in parallel. A second secondary battery cell and the capacitor are connected in parallel. A first terminal of the capacitor is connected to a ground terminal. While the first terminal of the capacitor is connected to the ground terminal. A voltage is taken out of the capacitor. Thus, a voltage corresponding to the output voltages of the first secondary battery cell and the second secondary battery cell connected to the capacitor in parallel can be stably obtained.

In addition, according to the present invention, a charging power supply and a capacitor are connected in parallel. A first terminal of the capacitor is connected to a ground potential. One selected from a first secondary battery cell and a second secondary battery cell and the capacitor are connected in parallel. The charging power supply and the capacitor are connected in parallel. The capacitor is charged by the charging power supply. The charging power supply is disconnected from the capacitor. The selected secondary battery cell and the capacitor are connected in parallel. The selected secondary battery cell is charged by the capacitor. Thus, while the secondary battery cells connected in series are balanced, they can be charged.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 17 is a circuit diagram showing an example of the structure for balancing battery cells using charging according to a fourth embodiment of the present invention;

FIG. 18 is a schematic diagram for explaining a switching operation corresponding to output voltages of secondary battery cells;

FIG. 19 is a circuit diagram showing an example of a structure for controlling a charger so as to balancing secondary battery cells; and FIG. 20 is a circuit diagram showing an example of a structure according to another modification of the first embodiment of the present invention.

DETAILED DESCRIPTION OF THE PREFERRED EMBODIMENTS

Next, with reference to the accompanying drawings, embodiments of the present invention will be described.

(First Embodiment)

Figure 4:
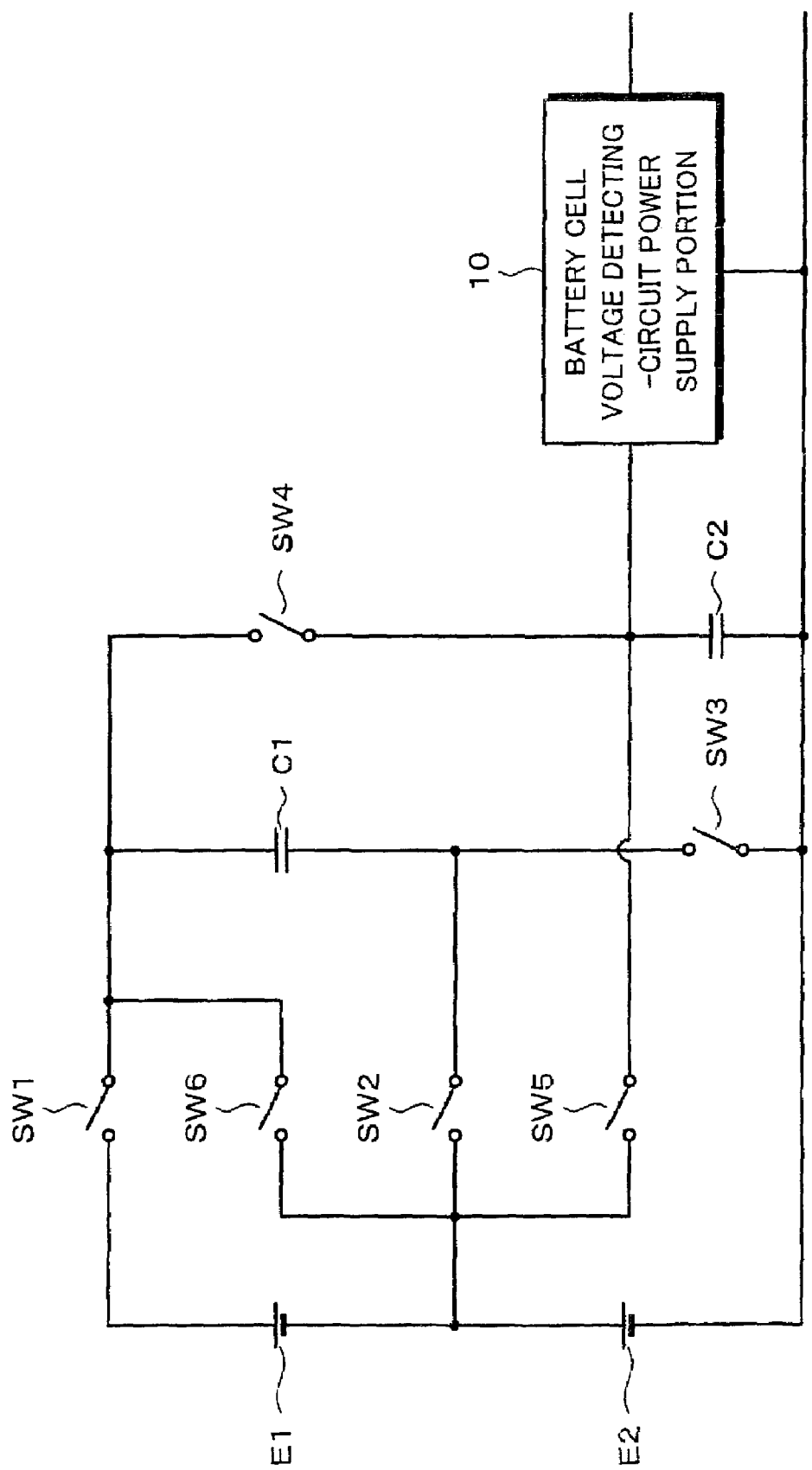
FIG. 4 is a circuit diagram showing an example of a structure for detecting voltages of secondary battery cells according to a first embodiment of the present invention.

FIG. 4 shows an example of a structure for detecting voltages of secondary battery cells according to a first embodiment of the present invention. Secondary battery cells E1 and E2 are connected in series. A negative electrode of the secondary battery cell E2 is connected to a ground potential. A positive electrode of the secondary battery cell E1 is connected to a first terminal of a switch SW1 that is composed of a switching device made of a semiconductor device such as a transistor. A second terminal of the switch SW1 is connected to a first terminal of a capacitor C1. In addition, the second terminal of the switch SW1 is connected to first terminals of a switch SW4 and a switch SW6. A second terminal of the switch SW4 is connected to a first terminal of a capacitor C2. A second terminal of the capacitor C2 is connected to the ground potential. A second terminal of the capacitor C1 is connected to the ground potential through a switch SW3.

A connected point of a negative electrode of the secondary battery cell E1 and a positive electrode of the secondary battery cell E2 is connected to a second terminal of the switch SW6 and first terminals of a switch SW2 and a switch SW5. A second terminal of the switch SW2 is connected to a connected point of the capacitor C1 and the switch SW3. A second terminal of the switch SW5 is connected to the connected point of the switch SW4 and the capacitor C2.

Both the first and second terminals of the capacitor C2 are connected to a battery cell voltage detecting—circuit power supply portion 10. In other words, a detection terminal of the battery cell voltage detecting—circuit power supply portion 10 is connected to the connected point of the switch SW4 and the capacitor C2. The ground terminal is connected to the ground potential.

In the structure shown in FIG. 4, when on/off states of the switches SW1 to SW6 are properly controlled, with respect to the secondary battery cell E1, the secondary battery cell E1 and the capacitor C1 can be connected in parallel independently from the others. In addition, the secondary battery cell E1, the capacitor C1, and the capacitor C2 can be connected in parallel independently from the others. With respect to the secondary battery cell E2, the secondary battery cell E2, the capacitor C1, and the capacitor C2 can be connected in parallel independently from the others.

Thus, when the secondary battery cell E1 and the capacitor C1 are connected in parallel, the capacitor C1 is charged with an output voltage of the secondary battery cell E1, and then the capacitors C1 and C2 are connected in parallel, the capacitor C2 is charged by the capacitor C1. After electric charges of the capacitors C1 and C2 have been balanced by the charging, a potential of both the first and second terminals of the capacitor C2 is detected. Corresponding to the detected potential of the capacitor C2, an output voltage of the secondary battery cell E1 can be obtained. Since the first terminal of the capacitor C2 is connected to the ground potential, the potential of the secondary battery cell E1 can be stably detected.

In other words, when the voltage of the secondary battery cell E1 is obtained, first, the switches SW1 and SW2 are turned on. The other switches SW3 and SW4 are turned off. The switches SW5 and SW6 are always kept in their off states. After the capacitor C1 has been charged by the secondary battery cell E1, the switches SW1 and SW2 are turned off. The switches SW3 and SW4 are turned on. After the capacitors C1 and C2 have been balanced, the switch SW3 is turned off. The potential of the capacitor C2 is detected by the battery cell voltage detecting-circuit power supply portion 10. After the potential of the capacitor C2 has been detected, the capacitor C2 is discharged by for example the battery cell voltage detecting—circuit power supply portion 10.

An output voltage of the secondary battery cell E2 can be obtained in the same manner. In other words, the secondary battery cell E2 and the capacitor C1 are connected in parallel. Thereafter, the forgoing process is performed. The potential of the capacitor C2 is detected. As a result, the output voltage of the secondary battery cell E2 can be obtained.

In other words, when the voltage of the secondary battery cell E2 is obtained, first, the switches SW1 and SW2 are turned off. The switches SW5 and SW4 are turned off. The switches SW3 and SW6 are turned on. After the capacitor C1 has been charged by the secondary battery cell E2, the switch SW6 is turned off. The switch SW4 is turned on. After the capacitor C1 and the capacitor C2 have been balanced, the switch SW3 is turned off. The potential of the capacitor C2 is detected by the battery cell voltage detecting-circuit power supply portion 10. After the potential has been detected, the capacitor C2 is charged by for example the battery cell voltage detecting-circuit power supply portion 10.

Since the negative electrode of the secondary battery cell E2 is connected to the ground potential, only the switch SW5 may be turned on. As a result, the capacitor C2 is charged. Thereafter, the switch SW5 is turned off. As a result, the potential of the capacitor C2 is detected by the battery cell voltage detecting-circuit power supply portion 10. At that point, the capacitor C1 is pre-discharged using the switches SW6, SW2, and SW3. The switch SW5 is turned on. As a result, the capacitor C2 is charged. Thereafter, the switch SW5 is turned off. The switches SW3 and SW4 are turned on. As a result, the capacitors C2 and C1 are balanced. As a result, the potential of the capacitor C2 is detected.

According to the present invention, in such a manner, an output voltage of a secondary battery cell is converted into electric charges charged to a capacitor. The electric charges are moved to another capacitor whose one terminal is connected to the ground potential. The potential of the other capacitor is detected. As a result, the output voltage of another secondary battery cell is obtained. Thus, the output voltage of the secondary battery cell that is not connected to the ground potential can be stably obtained.

Both the output voltages of the secondary battery cells E1 and E2 that are connected in series can be obtained by the battery cell voltage detecting-circuit power supply portion 10. Thus, the output voltages of the secondary battery cells E1 and E2 can be obtained with a small error.

Although not shown in FIG. 4, when charging and discharging of the secondary battery cells E1 and E2 are controlled corresponding to the detected output voltages of the secondary battery cells E1 and E2 connected in series, the secondary battery cells E1 and E2 can be balanced.

FIG. 4 shows an example of which the two secondary battery cells E1 and E2 are connected in series. However, the present invention is not limited to such an example. In other words, even if the number of secondary battery cells that are connected in series exceeds three, the first embodiment of the present invention can be applied.

Figure 5:
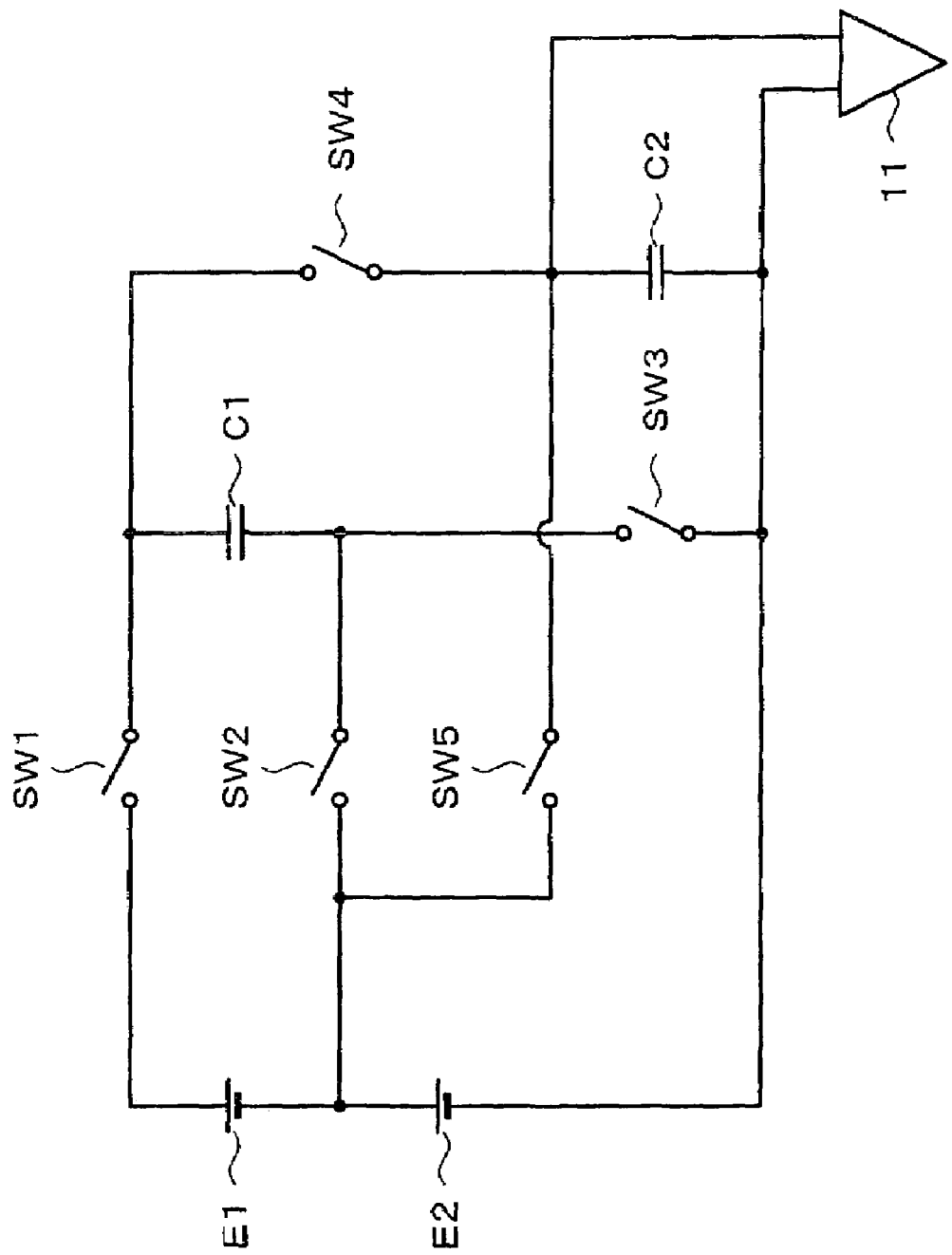
FIG. 5 is a circuit diagram showing an example of a structure for detecting voltages of secondary battery cells according to a modification of the first embodiment.

FIG. 5 shows an example of a structure for detecting voltages of secondary battery cells according to a modification of the first embodiment of the present invention. In the structure shown in FIG. 5, the switch SW6 is omitted from the charging apparatus according to the first embodiment shown in FIG. 4. In FIG. 5, portions similar to those in FIG. 4 will be denoted by similar reference numerals and their detail description will be omitted.

In the structure shown in FIG. 5, when only the switches SW1 and SW2 are turned on, the secondary battery cell E1 and the capacitor C1 are connected in series. When only the switches SW3 and SW4 are turned on, the capacitors C1 and C2 are connected in parallel. When only the switch SW5 is turned on, the secondary battery cell E2 and the capacitor C2 are connected in parallel.

First, the case that the output voltage of the secondary battery cell E1 is obtained will be described. The switches SW1 and SW2 are turned on. The other switches namely, the switches SW3, SW4, and SW5 are turned off. As a result, the secondary battery cell E1 and the capacitor C1 are connected in parallel. The capacitor C1 is charged with the output voltage of the secondary battery cell E1. After the capacitor C1 has been fully charged, the switches SW1 and SW2 are turned off. The switches SW3 and SW4 are turned on. The switch SW5 is kept in the off state. As a result, the capacitors C1 and C2 are connected in parallel. The capacitor C2 is charged with electric charges of the capacitor C1 until the capacitors C1 and C2 are balanced.

When the parallel connecting operation of the secondary battery cell E1 and the capacitor C1 and the parallel connecting operation of the capacitor C1 and the capacitor C2 are repeated, the potential of the capacitor C2 becomes almost equal to the output voltage of the secondary battery cell E1. Next, that theory will be described in brief. Now, it is assumed that the capacitance of the capacitor C1 is equal to that of the capacitor C2 and that they are C each. In addition, it is assumed that no electric charges are initially charged to the capacitor C2.

When charging is performed by the secondary battery cell E1 (whose output voltage is V), electric charges C×V=Q are charged to the capacitor C1. When the capacitor C1 and the capacitor C2 are connected in parallel, electric charges are moved so that the potential of the capacitor C1 becomes equal to the potential of the capacitor C2 (potential=V'). As a result, the capacitors C1 and C2 are balanced. Since the total quantity of electric charges does not change, the relation of Q=CV' (capacitor C1)+CV' (capacitor C2) is satisfied. Thus, electric charges that are charged to the capacitors C1 and C2 are Q/2 each.

Next, the capacitor C1 is disconnected from the capacitor C2. The capacitor C1 and the secondary battery cell E1 are connected in parallel. As a result, the capacitor C1 is recharged so that electric charges become C×V=Q. In that state, the capacitor C1 is disconnected from the secondary battery cell E1. Instead, the capacitors C1 and C2 are connected in parallel. Since electric charges Q/2 have been charged to the capacitor C2 in the forgoing operation, the total electric charges of the capacitors C1 and C2 become Q+Q/2. Corresponding to the electric charges, the capacitors C1 and C2 are balanced so that the potential of the capacitor C1 becomes equal to that of the capacitor C2. As a result, the electric charges of the capacitor C1 and the capacitor C2 become ¾×Q each.

When that operation is repeated, electric charges charged to the capacitor C2 gradually approach Q. As a result, the potential of the capacitor C2 becomes almost equal to the output voltage of the secondary battery cell E1. Thus, when the potential of the capacitor C2 is detected by a voltage detector 11, the same result as the output voltage of the secondary battery cell E1 is detected can be obtained. When the potential of the capacitor C2 is detected, it is necessary to turn off at least the switches SW4 and SW5.

Actually, when the capacitors C1 and C2 that have been connected in parallel by the switch control are balanced, the voltage detector 11 detects the potential of the capacitor C2 whenever the forgoing operation is repeated. The potential of the capacitor C2 that is detected at the timing that there is no voltage change is treated as the output voltage of the secondary battery cell E1. Alternatively, the number of times of the forgoing operation required until the potential of the capacitor C2 is almost saturated may be obtained beforehand. The potential of the capacitor C2 at the time that the number of times of the forgoing operation exceeds the pre-obtained number may be treated as the output voltage of the secondary battery cell E1.

In the forgoing description, it is supposed that the capacitance of the capacitor C1 is equal to that of the capacitor C2. However, it is clear that even if their capacitances are different, the forgoing operation is satisfied.

In contrast, when the output voltage of the secondary battery cell E2 is obtained, the switches SW1, SW2, SW3, and SW4 are turned off. The switch SW5 is turned on. As a result, the secondary battery cell E2 and the capacitor C2 are connected in parallel. After the capacitor C2 has been charged with the output voltage of the secondary battery cell E2, the switch SW5 is turned off. The potential of the capacitor C2 is detected by the voltage detector 11. The detected potential of the capacitor C2 corresponds to the output voltage of the secondary battery cell E2.

In the structure shown in FIG. 4, electric charges of the capacitors C1 and C2 are balanced. As a result, the potential of the capacitor C2 is detected. In other words, when the capacitance of the capacitor C1 is equal to that of the capacitor C2, the potential of the capacitor C2 must be ½ of the output voltage of the secondary battery cell E1 or the secondary battery cell E2. However, actually, due to fluctuations of capacitances of the capacitors C1 and C2, the potential of the capacitor C2 deviates from the value of ½ of the output voltage of the secondary battery cell E1 or the secondary battery cell E2.

The structure of the modification of the first embodiment has an advantage of which the output voltages of the secondary battery cells E1 and E2 can be detected regardless of the capacitances of the capacitors C1 and C2. In addition, since the output voltages of the secondary battery cells E1 and E2 are detected by the single voltage detector 11, there is an advantage of which the fluctuations of the detected results of the secondary battery cells E1 and E2 become small.

Figure 6:
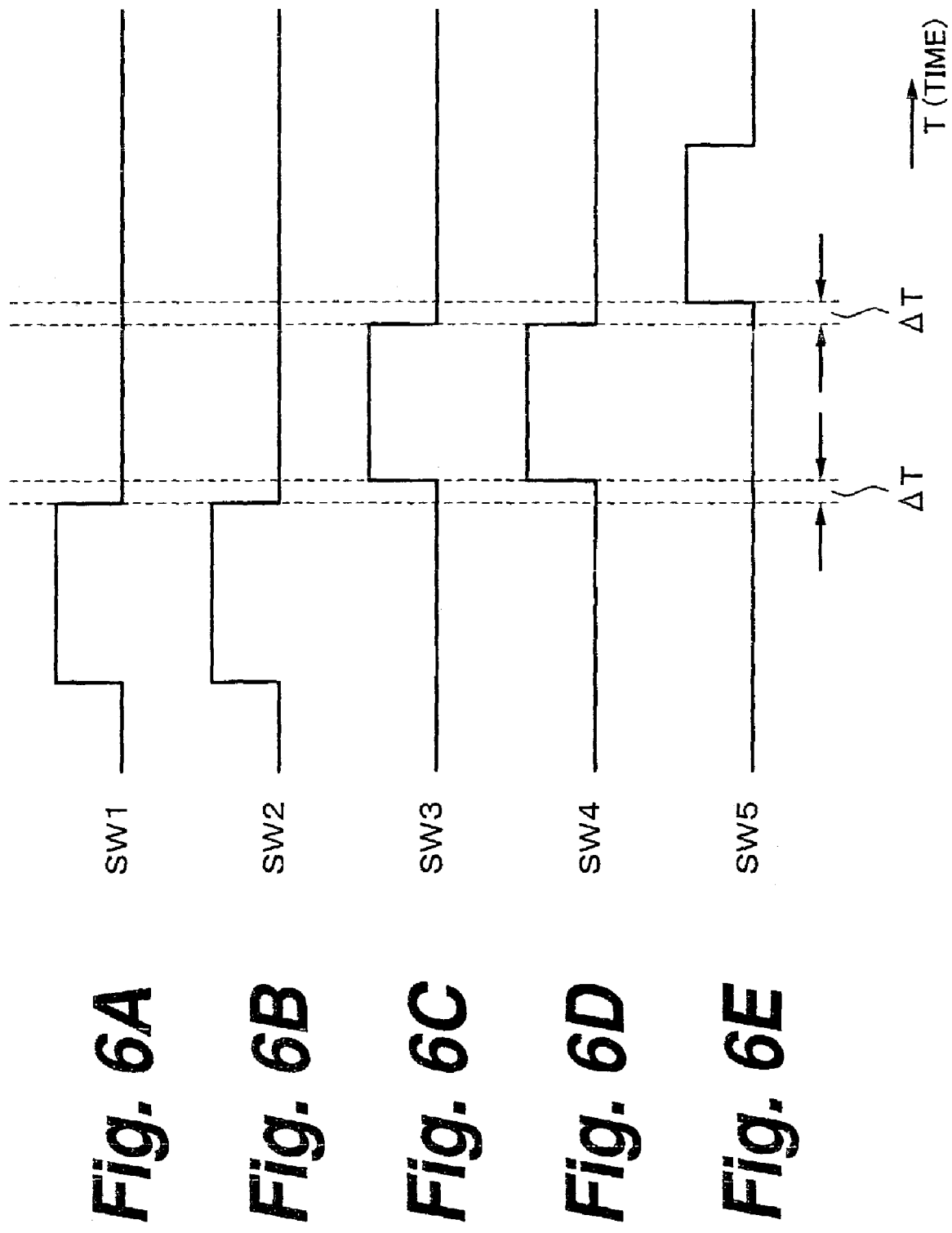
FIG. 6, consisting of FIGS. 6A, 6B, 6C and 6D is a timing chart showing exemplarily operational timings of switches in the structure according to the modification of the first embodiment.

FIG. 6 is a time chart showing exemplarily operational timings of the switches SW1 to SW5. After the capacitor C1 has been charged by the secondary battery cell E1, the switches SW1 and SW2 are turned off. The switches SW3 and SW4 are turned on. At that point, as shown in FIG. 6, the timings of which the switches SW3 and SW4 are turned on are delayed by a predetermined time period ÄT after the switches SW1 and SW2 have been turned off. Likewise, the switch SW5 is turned on with a delay of the predetermined time period ÄT after the switches SW3 and SW4 have been turned off.

Since there is a delay of ÄT after one switch is turned off until another switch is turned on, timings of the on states of the switches do not overlap. Thus, electric charges can be prevented from largely flowing to a capacitor. The on/off timing control applies to examples that follow.

Figure 7:
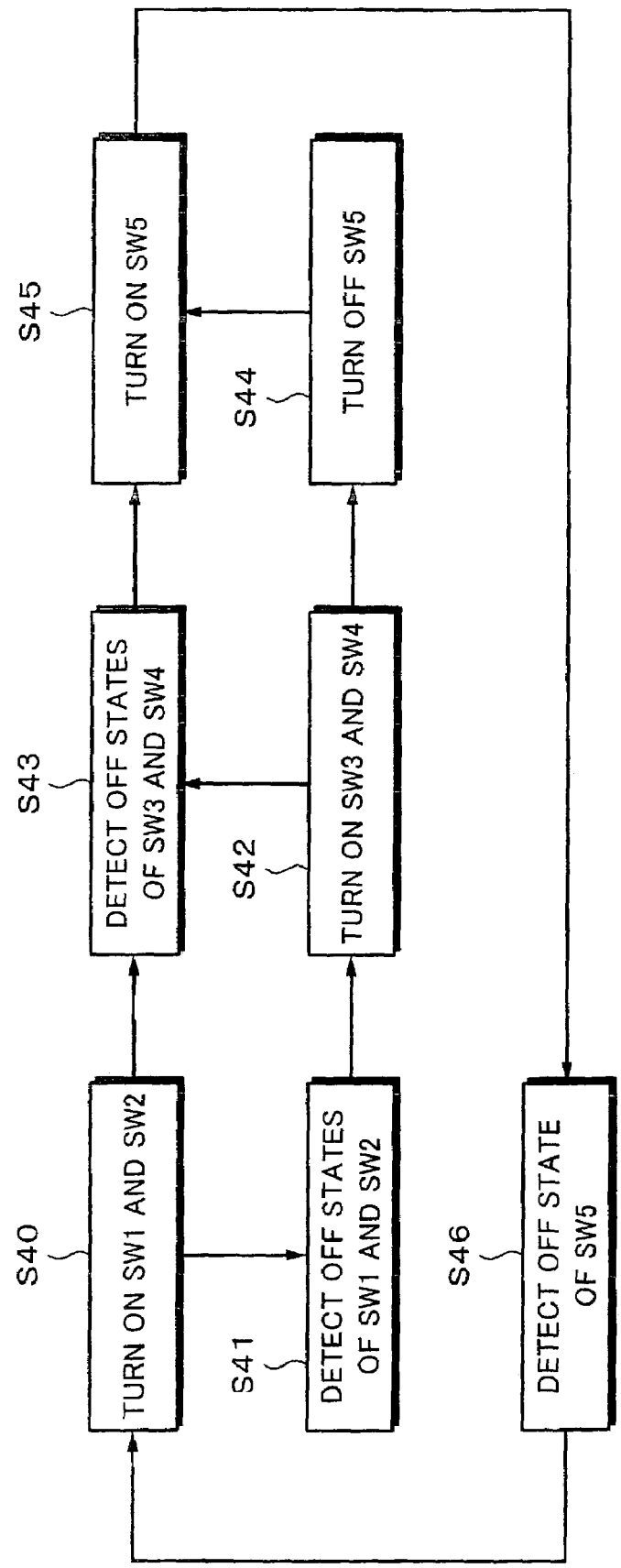
FIG. 7 is a flow chart showing an example of a controlling operation in the structure according to the modification of the first embodiment.

FIG. 7 is a flow chart showing an example of an operation in the case that the control shown in FIG. 6 is performed. The switches SW1 and SW2 are turned on (at step S40). Thereafter, the switches SW1 and SW2 are turned off. After the off states of the switches SW1 and SW2 have been detected (at step S41), with a delay of the time period ÄT, the switches SW3 and SW4 are turned on (at step S42). When the switches SW3 and SW4 are turned on, the switch SW5 is turned off (at step S44). Thereafter, the switches SW3 and SW4 are turned off. When the off states of the switches SW3 and SW4 are detected (at step S43), with a delay of the time period ÄT, the switch SW5 is turned on (at step S45). Thereafter, the switch SW5 is turned off. When the off state of the switch SW5 is detected (at step S46), the flow returns to step S40. With a delay of the time period ÄT, the switches SW1 and SW2 are turned on. When it is determined that one switch has been turned on and then turned off in a particular sequence, the next switch is turned on.

In FIG. 5, an example of which the two secondary battery cells E1 and E2 are connected in series has been described. However, the present invention is not limited to such an example. In other words, even if the number of secondary battery cells connected in series is three or more, the modification of the first embodiment can be applied.

Figure 8:
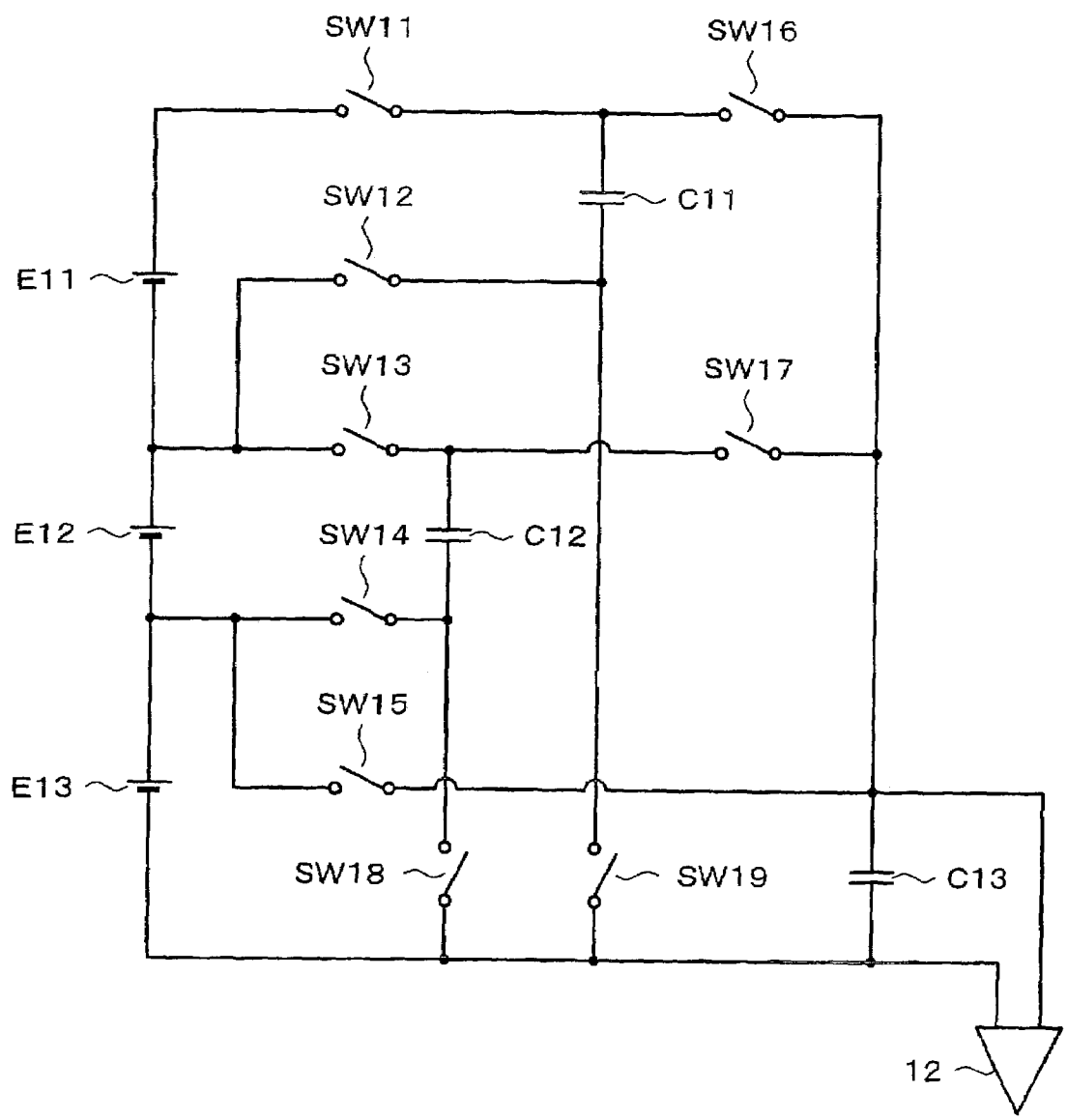
FIG. 8 is a circuit diagram showing an example of a structure for detecting voltages of three secondary battery cells that are connected in series.

FIG. 8 shows an example of a structure for detecting voltages of three secondary battery cells E11, E12, and E13 that are connected in series. In the structure shown in FIG. 8, when only switches SW11 and SW12 are turned on, the secondary battery cell E11 and a capacitor C11 are connected in parallel. When only switches SW13 and SW14 are turned on, the secondary battery cell E12 and a capacitor C12 are connected in parallel. When only a switch SW15 is turned on, the secondary battery cell E13 and a capacitor C13 are connected in parallel. When only switches SW16 and SW19 are turned on, the capacitors C11 and C13 are connected in parallel. When only switches SW17 and SW18 are turned on, the capacitors C12 and C13 are connected in parallel.

When an output voltage of the secondary battery cell E11 is detected, the switches SW16 and SW19 are turned off. The switches SW11 and SW12 are turned on. As a result, the capacitors E11 and C11 are connected in parallel. Thus, the capacitor C11 is charged. Thereafter, the switches SW11 and SW12 are turned off. The switches SW16 and SW19 are turned on. As a result, the capacitors E11 and C11 are connected in parallel. Thus, electric charges are moved between the capacitors C11 and C13. As a result, the capacitors C11 and C13 are balanced. That operation is repeated until the potential of the capacitor C13 becomes almost equal to the output voltage of the secondary battery cell E11. When the potential of the capacitor C13 becomes almost equal to the output voltage of the secondary battery cell E11, the switch SW16 and the switch SW19 are turned off. The potential of the capacitor C13 is detected by a voltage detector 12.

While the output voltage of the secondary battery cell E11 is being detected, the switches SW13, SW14, SW15, and SW17 are kept in their off states.

When an output voltage of the secondary battery cell E12 is detected, the switch SW11, SW12, SW15, SW16, and SW19 are turned off. In that state, the switch SW17 and SW18 are turned off. The switches SW13 and SW14 are turned on. As a result, the secondary battery cell E12 and the capacitor C12 are connected in parallel and the capacitor C12 is charged. Thereafter, the switches SW13 and SW14 are turned off. The switches SW17 and SW18 are turned on. As a result, the capacitors C12 and C13 are connected in parallel. Electric charges are moved between the capacitors C12 and C13 and they are balanced. That operation is repeated until the potential of the capacitor C13 becomes almost equal to the output voltage of the secondary battery cell E12. When the potential of the capacitor C13 becomes almost equal to the output voltage of the secondary battery cell E12, the switch SW17 and SW18 are turned off. The potential of the capacitor C13 is detected by the voltage detector 12.

When an output voltage of the secondary battery cell E13 is detected, only the switch SW15 is turned on. All the switch SW11, SW12, SW13, SW14, SW16, SW17, SW18, and SW19 are turned off. As a result, the secondary battery cell E13 and the capacitor C13 are connected in parallel. After the capacitor C13 has been charged with the output voltage of the secondary battery cell E13, the switch SW15 is turned off. The potential of the capacitor C13 is detected by the voltage detector 12.

In such a manner, by the switch control, a secondary battery cell whose negative electrode is not connected to the ground potential and a capacitor are connected in parallel. That capacitor and a capacitor disposed immediately upstream of the voltage detector are connected in parallel so as to detect a potential. Thus, even if three or more secondary battery cells are connected in series, the present invention can be applied to such a structure.

(Second Embodiment)

Next, a second embodiment of the present invention will be described. The second embodiment of the present invention relates to a method for balancing a plurality of secondary battery cells that are connected in series. When two secondary battery cells that are connected in series are unbalanced, one secondary battery cell having a larger battery capacity charges another secondary battery cell having a smaller battery capacity. As was described above, output voltages, namely, battery capacities, of secondary battery cells that are connected in series are detected. Corresponding to the detected results, the secondary battery cells are discharged and charged. As a result, the secondary battery cells are balanced.

Figure 9:
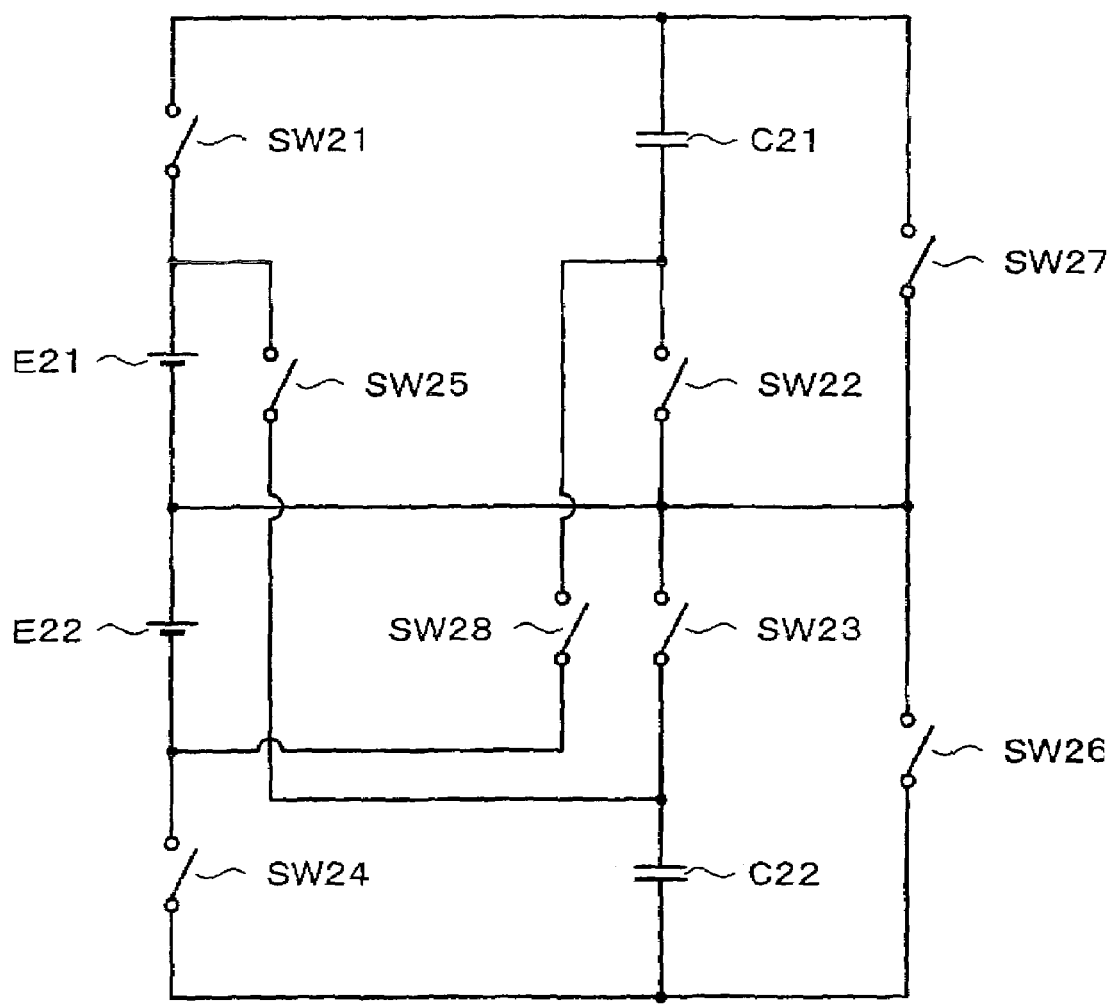
FIG. 9 is a circuit diagram showing an example of a structure for balancing battery cells according to a second embodiment of the present invention.

FIG. 9 shows an example of a structure for balancing two secondary battery cells E21 and E22 that are connected in series. The structure shown in FIG. 9 is used along with the structure of the detecting system shown in FIG. 5. However, in FIG. 9, for simplicity, the structure for the detecting system will be omitted.

A negative electrode of the secondary battery cell E21 and a positive electrode of the secondary battery cell E22 are connected. Thus, the secondary battery cells E21 and E22 are connected in series. A positive electrode of the secondary battery cell E21 is connected to a first terminal of a switch SW21. A second terminal of the switch SW21 is connected to first terminals of a capacitor C21 and a switch SW27. A second terminal of the switch SW27 is connected to a first terminal of a switch SW26. The second terminal of the switch SW27 is connected to first terminals of switches SW22 and SW23 and to a connected point of the secondary battery cells E21 and E22.

A second terminal of the switch SW26 is connected to a first terminal of a capacitor C22 and a second terminal of a switch SW24. A second terminal of the capacitor C22 is connected to a second terminal of the switch SW23. A connected point of the secondary battery cell E21 and the switch SW21 is connected to a connected point of the capacitor C22 and the switch SW23 through a switch SW25. A connected point of the secondary battery cell E22 and the switch SW24 is connected to a connected point of the capacitor C21 and the switch SW22 through a switch SW28.

In other words, in the structure shown in FIG. 9, when only the switches SW21 and SW22 are turned on, the secondary battery cell E21 and the capacitor C21 are connected in parallel. When only the switches SW25 and SW26 are turned on, the secondary battery cell E21 and the capacitor C22 are connected in parallel. When only the switches SW27 and SW28 are turned on, the secondary battery cell E22 and the capacitor C21 are connected in parallel. When only the switches SW23 and SW24 are turned on, the secondary battery cell E22 and capacitor C22 are connected in parallel.

In such a structure, the case that the detected results of the output voltages V21 and V22 of the secondary battery cells E21 and E22 satisfy the relation of V21>V22 will be described. In that case, the secondary battery cell E21, which has a higher output voltage, is discharged. The secondary battery cell E22, which has a lower output voltage, is charged. In other words, the capacitor C21 is charged with the output voltage of the secondary battery cell E21. Thereafter, the secondary battery cell E22 is charged with electric charges of the capacitor C21. In such a manner, the switches are controlled.

In more reality, only the switches SW21 and SW22 are turned on. As a result, the capacitor C21 is charged with the output voltage of the secondary battery cell E21. The secondary battery cell E21 is discharged. The capacitor C21 is charged so that the potential thereof becomes equal to the output voltage of the secondary battery cell E21. After the capacitor C21 has been charged, the switches SW21 and SW22 are turned off. With a delay of the predetermined time period ÄT, only the switches SW27 and SW28 are turned on. Since the capacitor C21 has been charged with the same potential as that of the secondary battery cell E21, which has the relation of V21>V22, the secondary battery cell E22 can be charged with electric charges charged in the capacitor C21.

In the case that the detected results of the output voltages of the secondary battery cells E21 and E22 satisfy the relation of V21<V22, likewise, the secondary battery cells E21 and E22 are discharged and charged. In other words, each switch is controlled so that the capacitor C22 is charged by the secondary battery cell E22, which has a higher output voltage, and that the secondary battery cell E21 is charged with electric charges of the capacitor C22.

In more reality, only the switches SW23 and SW24 are turned on. As a result, the secondary battery cell E22 is discharged and the capacitor C22 is charged. After the capacitor C22 has been charged, the switches SW23 and SW24 are turned off. With a delay of the predetermined time period ÄT, only the switches SW25 and SW26 are turned on. With electric charges charged in the capacitor C22, the secondary battery cell E21 is charged.

The secondary battery cells E21 and E22 are charged and discharged using the capacitor C22 until V21 becomes almost V22 while the output voltages of the secondary battery cell E21 and E22 are always being monitored. As a result, the secondary battery cells E21 and E22 can be balanced.

For example, the output voltages of the secondary battery cells E21 and E22 are detected. When the detected results represent that the secondary battery cells E21 and E22 are unbalanced, each switch is controlled in a predetermined manner. Corresponding to the detected results, one secondary battery cell (secondary battery cell E21) that has a higher output voltage discharges the capacitor C21 in the forgoing method. The capacitor C21 charges another secondary battery cell (secondary battery cell E22) that has a lower output voltage. After the other secondary battery cell has been charged by the capacitor C21, the output voltages of the secondary battery cells E21 and E22 are detected. When the determined results represent that the secondary battery cells are balanced, the charging operation and discharging operation are stopped. When the detected results represent that the secondary battery cells are unbalanced, the secondary battery cells E21 and E2 are charged and discharged again.

Figure 10:
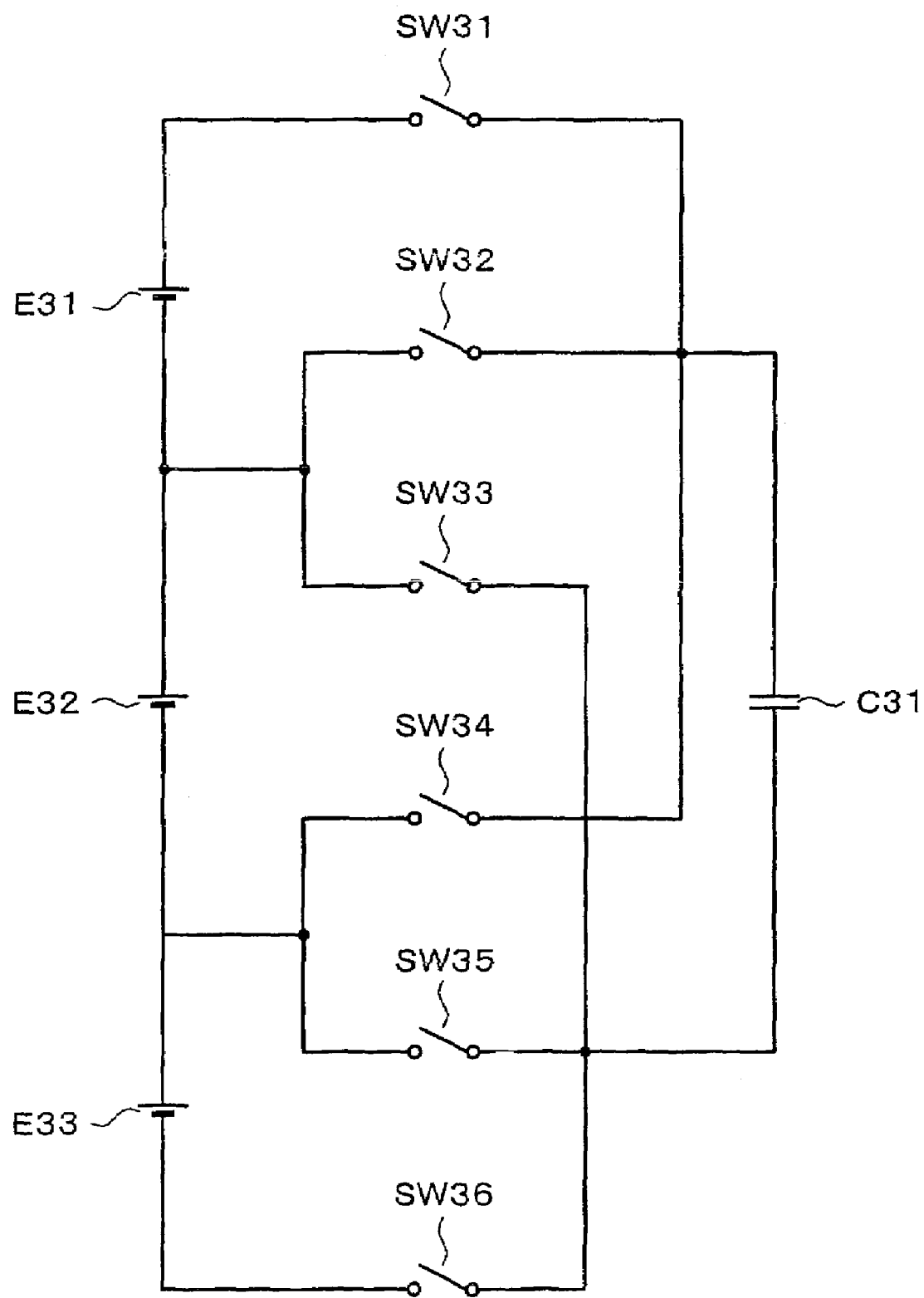
FIG. 10 is a circuit diagram showing an example of a structure using two-way switches.

FIG. 10 shows an example of a structure according to a modification of the second embodiment of the present invention. In the structure, three secondary battery cells E31, E32, and E33 that are connected in series are balanced using two-way switches. In the structure shown in FIG. 9, a current flows in only one way in each of the switches SW21 to SW28. Thus, as the switches SW21 to SW28, one-way switches in which a current flows in one way in on state can be used. However, when two-way switches that allow a current to flow in two ways in on state are used, the circuit structure will be more simplified.

In the structure shown in FIG. 10, when only switches SW31 and SW33 are turned on, a secondary battery cell E31 and a capacitor C31 are connected in parallel. When only switches SW32 and SW35 are turned on, the secondary battery cell E32 and the capacitor C31 are connected in parallel. When only switches SW33 and SW36 are turned on, the secondary battery cell E33 and the capacitor C31 are connected in parallel.

In such a structure, the case that for example V31=V32>V33 will be considered. In that case, electric charges are moved from the secondary battery cell E31 to the secondary battery cell E33 through the capacitor C31. Next, electric charges are moved from the secondary battery cell E32 to the secondary battery cell E33 through the capacitor C31. Output voltages of the secondary battery cells E31, E32, and E33 are detected and those operations are repeated until the relation of V31=V32=V33 is almost satisfied.

In reality, only the switch SW31 and SW33 are turned on. As a result, the capacitor C31 is charged with the output voltage of the secondary battery cell E31. After the capacitor C31 has been charged, the switch SW31 and SW33 are turned off. With a delay of the predetermined time period ÄT, the switches SW34 and SW36 are turned on. As a result, the secondary battery cell E33 is charged with electric charges charged in the capacitor C31. After the secondary battery cell E33 has been charged, the switches SW34 and SW36 are turned off. With a delay of the time period ÄT, the switches SW32 and SW35 are turned on. As a result, the capacitor C31 is charged with the output voltage of the secondary battery cell E32. After the capacitor C31 has been charged, the switches SW32 and SW35 are turned off. With a delay of the predetermined time period ÄT, the switches SW34 and SW36 are turned on. As a result, the secondary battery cell E33 is charged with electric charges charged in the capacitor C31. Thereafter, the switches SW34 and SW36 are turned off. With a delay of the time period ÄT, only the switches SW31 and SW33 are turned on. As a result, the capacitor C31 is charged with the output voltage of the secondary battery cell E31. Those operations are repeated until the relation of V31=V32=V33 is almost satisfied.

Figure 11:
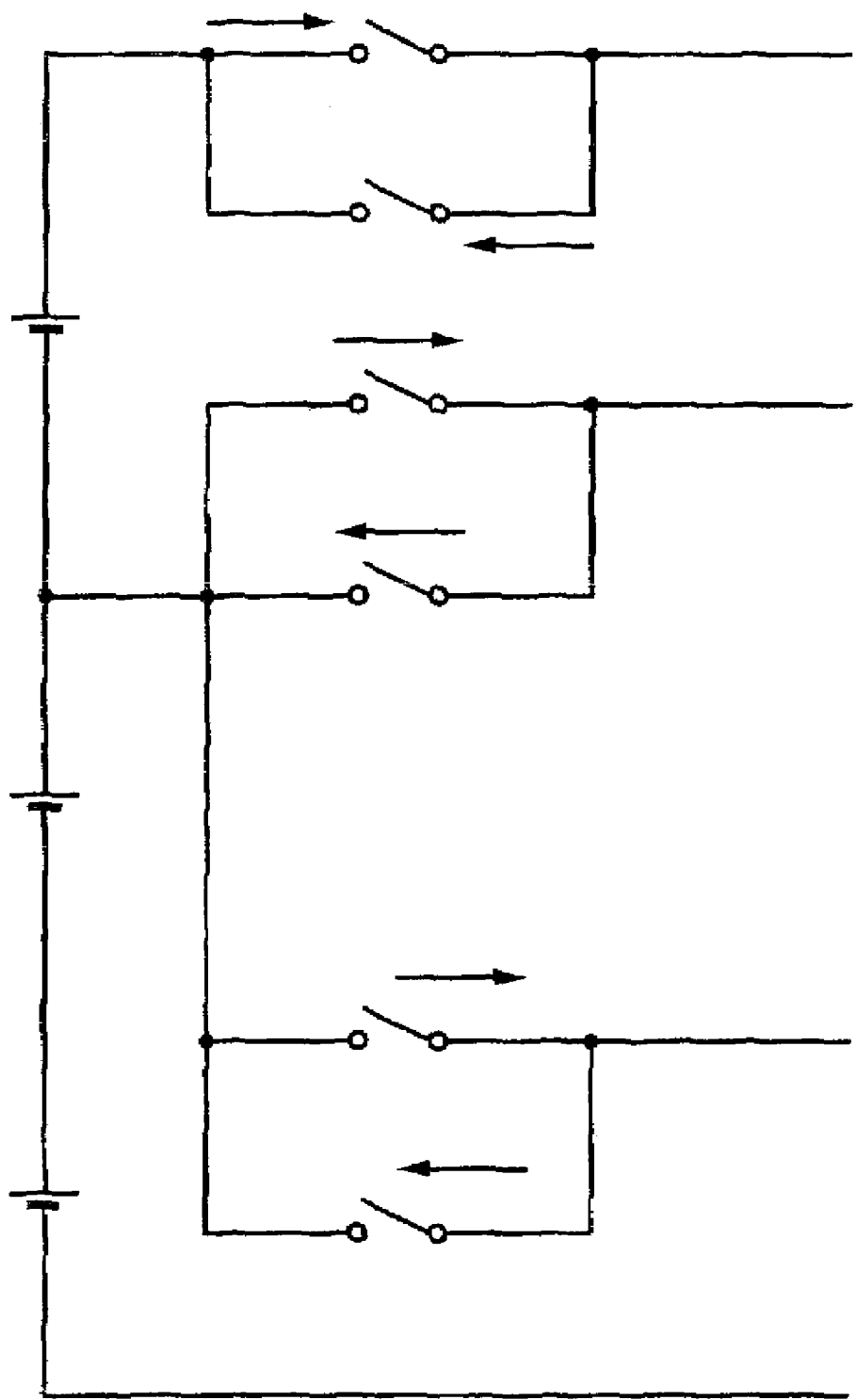
FIG. 11 is a schematic diagram for describing accomplishment of a function of two-way switches with one-way switches.

When the two-way switches are used, only the capacitor C31, which charges electric charges, is used. Thus, the structure can be simplified. Alternatively, as exemplified in FIG. 11, when two one-way switches are connected in their opposite directions and their on/off states are properly controlled corresponding to current directions, the same function as a two-way switch can be accomplished. A switch composed of a set of one-way switches can be applied to the example shown in FIG. 10. The direction of the switches selected upon which the secondary battery cells E31, E32, and E33 charge the capacitor C31 is different from the switches selected upon which the capacitor C31 charges the secondary battery cells E31, E32, and E33.

(Third Embodiment)

Next, a third embodiment of the present invention will be described. The third embodiment of the present invention relates to a method for supplying a circuit power to a controlling circuit, a voltage detecting circuit, and so forth. When secondary battery cells are connected in series, output voltages of the secondary battery cells are detected. Corresponding to the detected results, a secondary battery cell having a higher output voltage preferentially supplies the circuit power.

Figure 12:
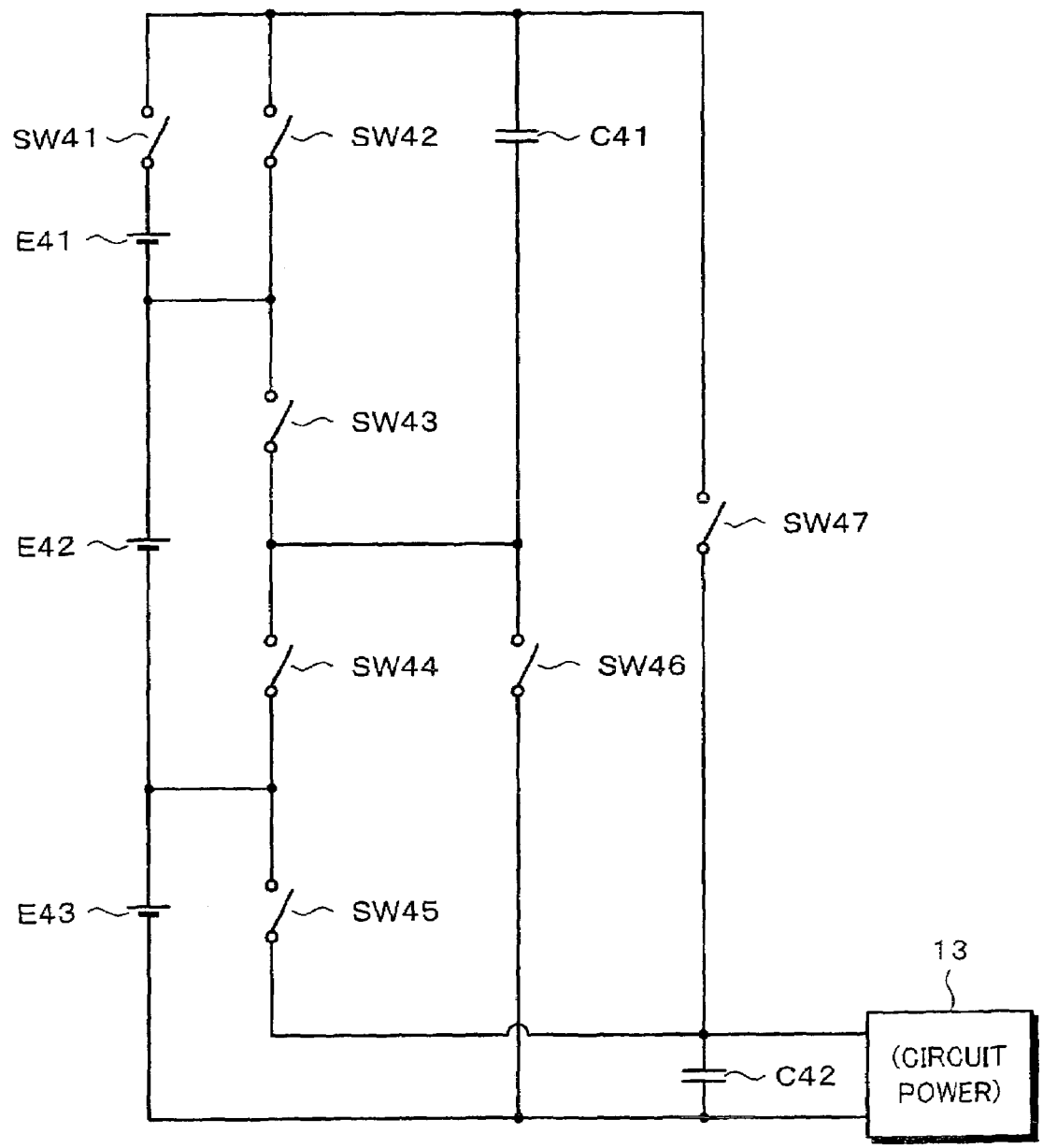
FIG. 12 is a circuit diagram showing an example of a structure for supplying a circuit power from secondary battery cells connected in series according to a third embodiment of the present invention.

FIG. 12 shows an example of a structure according to the third embodiment. In the structure according to the third embodiment, three secondary battery cells E41, E42, and E43 are connected in series. A secondary battery cell that has a higher output voltage in those three secondary battery cells preferentially supplies a circuit power. Like the forgoing operations of which voltages of secondary battery cell are detected and secondary battery cells are balanced, secondary battery cells E41, E42, and E43 charge a capacitor C41. The capacitor C41 charges a capacitor C42. The capacitor C42 supplies a circuit power 13 to a controlling circuit, a voltage detecting circuit, and so forth.

A negative electrode of the secondary battery cell E43 of the secondary battery cells E41, E42, and E43 is connected to a ground potential. A positive electrode of the secondary battery cell E41 is connected first terminals of a switch SW42, a capacitor C41, and a switch SW47 through a switch SW41. A connected point of the secondary battery cells E41 and E42 is connected to a second terminal of the switch SW42 and a first terminal of the switch SW43. A second terminal of the switch SW43 is connected to connected to a first terminal of a switch SW44 and a second terminal of the capacitor C41. In addition, the second terminal of the switch SW44 is connected to the ground potential through a switch SW46. A connected point of the secondary battery cells E42 and E43 is connected to a second terminal of the switch SW44 and a first terminal of the switch SW45. A second terminal of the switch SW45 is connected to a second terminal of the switch SW47. In addition, the second terminal of the switch SW45 is connected to a first terminal of the capacitor C42. A second terminal of the capacitor C42 is connected to the ground potential. The circuit power 13 is supplied from both the first and second terminals of the capacitor C42.

In the structure shown in FIG. 12, the circuit power 13 is supplied in the following manner. When the secondary battery cell E41 supplies the circuit power 13, only the switches SW41 and SW43 are turned on. As a result, the capacitor C41 is charged with the output voltage of the secondary battery cell E41. After the capacitor C41 has been charged, the switches SW41 and SW43 are turned off. The switches SW46 and SW47 are turned on. As a result, the capacitor C42 is charged with electric charges of the capacitor C41. Electric charges charged in the capacitor C42 are supplied as the circuit power 13. After the capacitor C42 has been charged, it is preferred to turn off the switches SW46 and SW47.

The secondary battery cell E42 supplies the circuit power 13 in the same manner as the secondary battery cell E41 does. In that case, only the switches SW42 and SW44 are turned on. As a result, the capacitor C41 is charged with the output voltage of the secondary battery cell E42. After the capacitor C41 has been charged, the switches SW41 and SW43 are turned off. The switches SW46 and SW47 are turned on. As a result, the capacitor C42 is charged with electric charges of the capacitor C41. When the secondary battery cell E43 supplies the circuit power 13, only the switch SW45 is turned on. As a result, the capacitor C42 is charged with the output voltage of the secondary battery cell E43.

In such a manner, when the switches SW41 to SW47 are controlled and the secondary battery cells E41, E42, and E43 each supplies the circuit power 13, the output voltages of the secondary battery cells E41, E42, and E43 are detected by a voltage detecting circuit (not shown). Corresponding to the detected result, the secondary battery cells E41, E42, and E43 that have higher output voltages preferentially more charge the capacitor C42 than the others. Thus, while the secondary battery cells E41, E42, and E43, which are connected in series, are being balanced, the circuit power 13 can be supplied.

Figure 13:
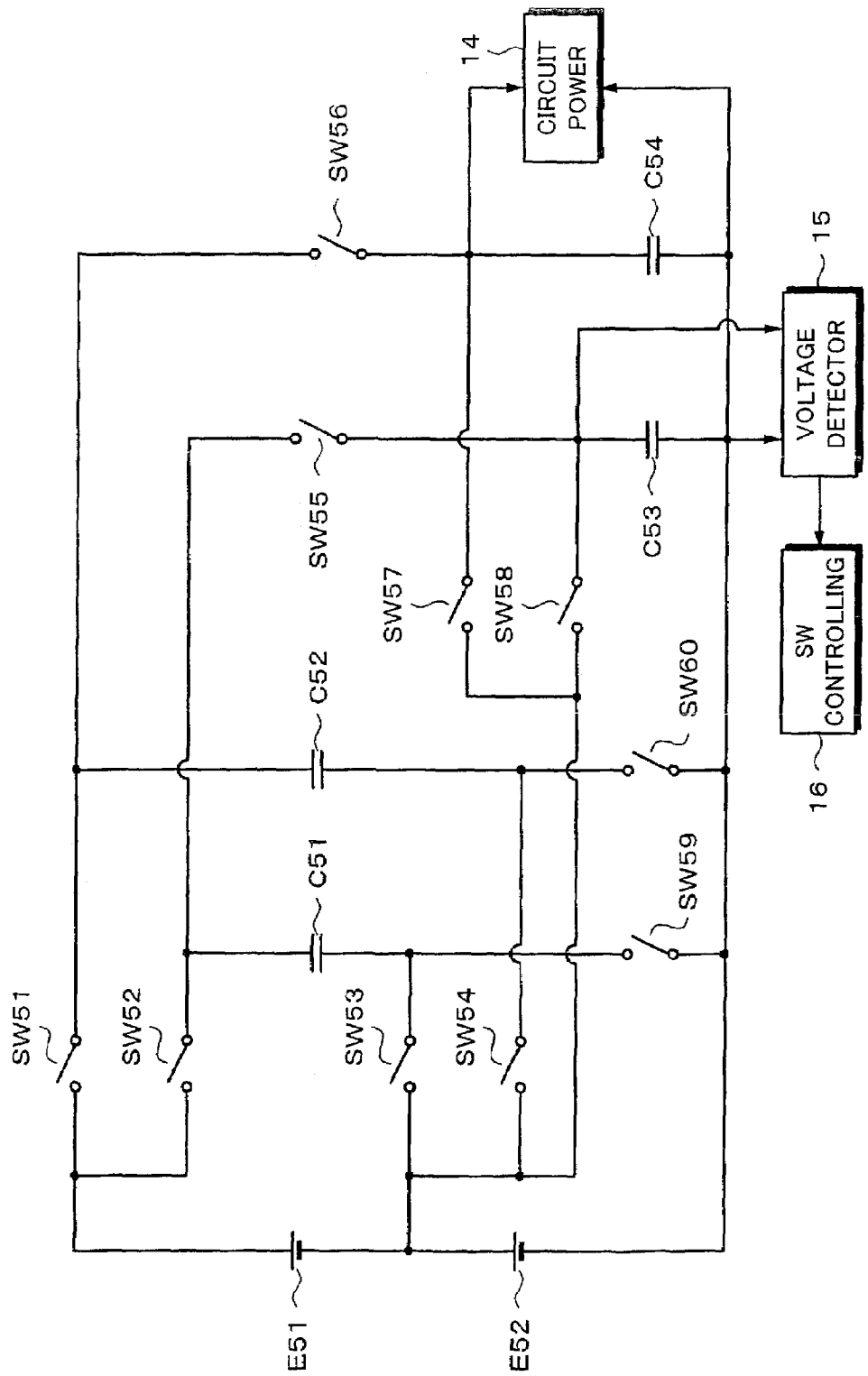
FIG. 13 is a circuit diagram showing an example of a structure for supplying a circuit power while detecting output voltages of secondary battery cells connected in series according to a modification of the third embodiment.

FIG. 13 shows a structure of a modification of the third embodiment. In the structure, while output voltages of secondary battery cells E51 and E52 are being detected, a circuit power 14 is supplied. In the structure shown in FIG. 13, the voltage detecting circuit shown in FIG. 5 and a circuit power supplying circuit that has the same structure as that thereof are integrated as one circuit.

According to the structure shown in FIG. 13, output voltages of the secondary battery cells E51 and E52 are detected. Corresponding to the detected results, the circuit power 14 is supplied. At that point, a secondary battery cell that has a higher output voltage preferentially supplies the circuit power 14. Thus, while the circuit power 14 is being supplied, the secondary battery cells E51 and E52 can be balanced.

First of all, the voltage detecting circuit side will be described. In the secondary battery cells E51 and E52 that are connected in series, a negative electrode of the secondary battery cell E52 is connected to a ground potential. A positive electrode of the secondary battery cell E51 is connected to first terminals of switches SW51 and SW52. Among them, the switch SW52 side is a voltage detecting circuit. A second terminal of the switch SW52 is connected to first terminals of a capacitor C51 and a switch SW55. A connected point of the secondary battery cells E51 and E52 is connected to first terminals of switches SW53, SW54, SW57, and SW58. Among them, the switches SW53 and SW58 compose the voltage detecting circuit. A second terminal of the switch SW53 is connected to a second terminal of the capacitor C51. In addition, the second terminal of the switch SW53 is connected to the ground potential through a switch SW59. A second terminal of the switch SW58 is connected to a second terminal of the switch SW55. In addition, the second terminal of the switch SW58 is connected to a first terminal of a capacitor C53. A second terminal of the capacitor C53 is connected to the ground potential. Both the first and second terminals of the capacitor C53 are connected to a voltage detector 15. A detected result of the voltage detector 15 is supplied to a switch (SW) controlling circuit 16.

Next, the circuit power supplying circuit side will be described. A second terminal of the switch SW51 is connected to first terminals of a capacitor C52 and a switch SW56. A second terminal of the switch SW54 is connected to a second terminal of the capacitor C52. In addition, the second terminal of the switch SW54 is connected to the ground potential through a switch SW60. A second terminal of the switch SW57 is connected to a second terminal of the switch SW56. In addition, the second terminal of the switch SW57 is connected to a first terminal of a capacitor C54. A second terminal of the capacitor C54 is connected to the ground potential. The circuit power 14 is supplied from both the first and second terminals of the capacitor C54. The circuit power 14 is a driving power for the switch controlling circuit 16.

In such a structure, the output voltage of the secondary battery cell E51 is detected in the same manner as the output voltage of the secondary battery cell E1 shown in FIG. 5 is detected. First, the switches SW52 and SW53 are turned on. As a result, the capacitor C51 is charged with the output voltage of the secondary battery cell E51. After the capacitor C51 has been charged, the switches SW52 and SW53 are turned off. With a delay of a time period ÄT, the switches SW55 and SW59 are turned on. The capacitor C53 is charged with electric charges of the capacitor C51 until the capacitor C51 and the capacitor C53 are balanced. The capacitor C51 is charged by the secondary battery cell E51 and the capacitor C53 is charged by the capacitor C51 a predetermined number of times. When the output voltage of the secondary battery cell E51 becomes almost equal to the potential of the capacitor C53, the potential of the capacitor C53 is detected by the voltage detector 15.

The output voltage of the secondary battery cell E52 is detected in the same method as the output voltage of the secondary battery cell E2 shown in FIG. 5 is detected. In other words, only the switch SW58 is turned on. As a result, the capacitor C53 is charged by the secondary battery cell E52. After the capacitor C53 has been charged, the switch SW58 is turned off. The potential of the capacitor C53 is detected by the voltage detector 15.

The detected results of the output voltages of the secondary battery cells E51 and E52 detected by the voltage detector 15 are supplied to the switch controlling circuit 16. Corresponding to the detected results, the switch controlling circuit 16 controls on/off states of the switches SW51 to SW60.

The circuit power 14 is supplied almost in the same manner as the voltages of the secondary battery cells E51 and E52 are detected. When the circuit power 14 is supplied by the secondary battery cell E51, only the switches SW51 and SW54 are turned on. As a result, the capacitor C52 is charged by the secondary battery cell E51. After the capacitor C52 has been charged, the switches SW51 and SW54 are turned off. With a delay of a time period ÄT, the switches SW56 and SW60 are turned on. As a result, the capacitor C54 is charged with electric charges of the capacitor C52. After the capacitor C54 has been charged, the switches SW56 and SW60 are turned off. The circuit power 14 is supplied with electric charges of the capacitor C54. Alternatively, when the switches SW56 and SW60 are turned on, the supply of the circuit power 14 may be started.

When the circuit power 14 is supplied by the secondary battery cell E52, only the switch SW57 is turned on. As a result, the capacitor C53 is charged by the secondary battery cell E52. After the capacitor C53 has been charged, the switch SW57 is turned off. As a result, the circuit power 14 is supplied with electric charges of the capacitor C53.

As was described above, the circuit power 14 is preferentially supplied from one of the secondary battery cells E51 and E52 that has a higher output voltage than the other corresponding to the detected results of the output voltages thereof. As a result, the secondary battery cells E51 and E52 can be balanced. Although the output voltages of the secondary battery cells E51 and E52 may be detected in another method, when the detecting method according to the forgoing embodiment is used, those voltages can be more accurately detected than the other method.

In FIG. 13, a voltage detecting circuit and a circuit power supplying circuit are disposed in parallel in one circuit. Alternatively, those circuits may be structured in common. However, if the circuit and detection impedances are low, detected voltages may be incorrect. Thus, it is preferred to independently provide a voltage detecting circuit and a circuit power supplying circuit as shown in FIG. 13.

Figure 14:
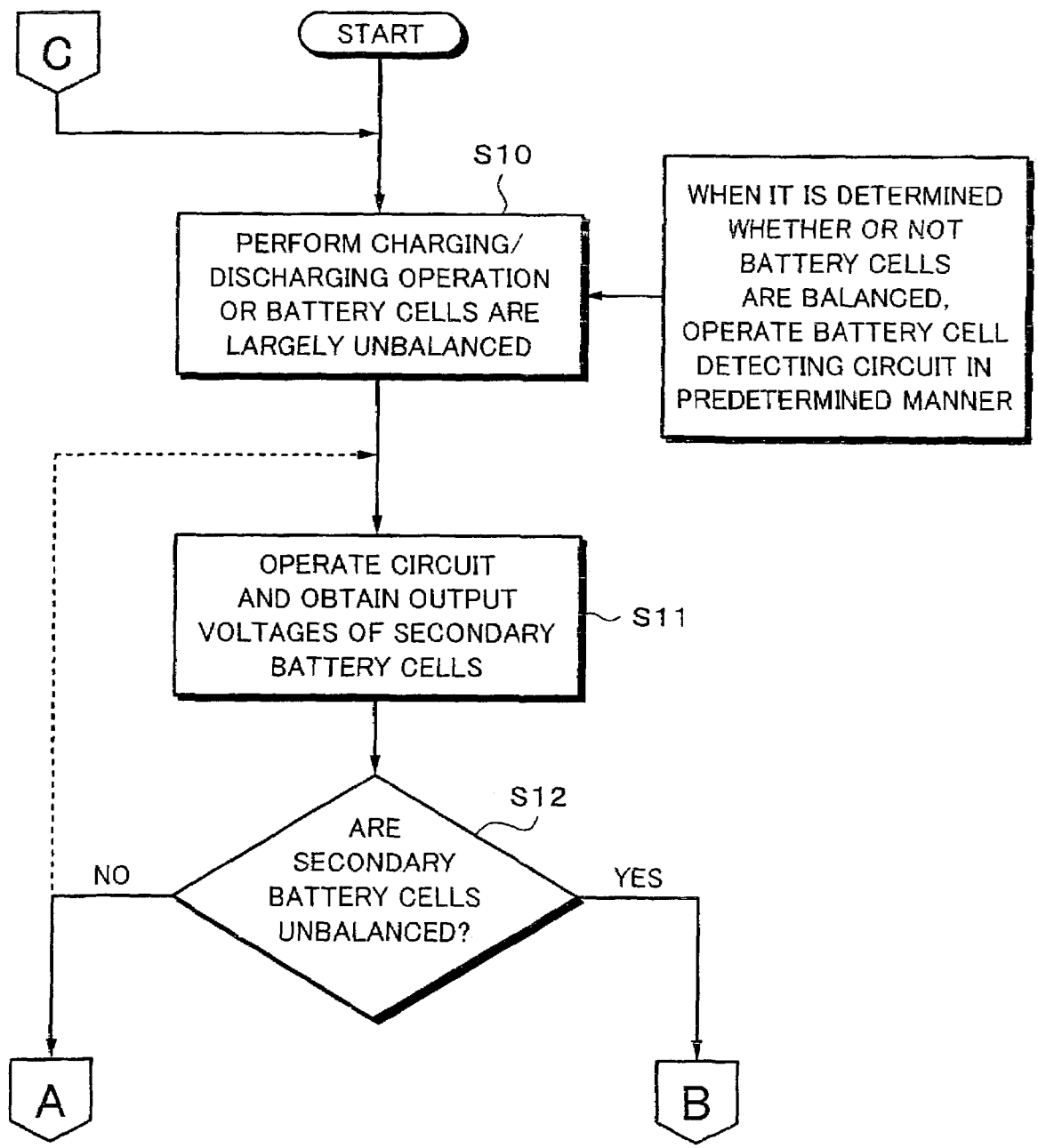
FIG. 14 is a flow chart showing the operation of the example of the structure for supplying the circuit power while detecting the output voltages of the secondary battery cells that are connected in series.
Figure 15:
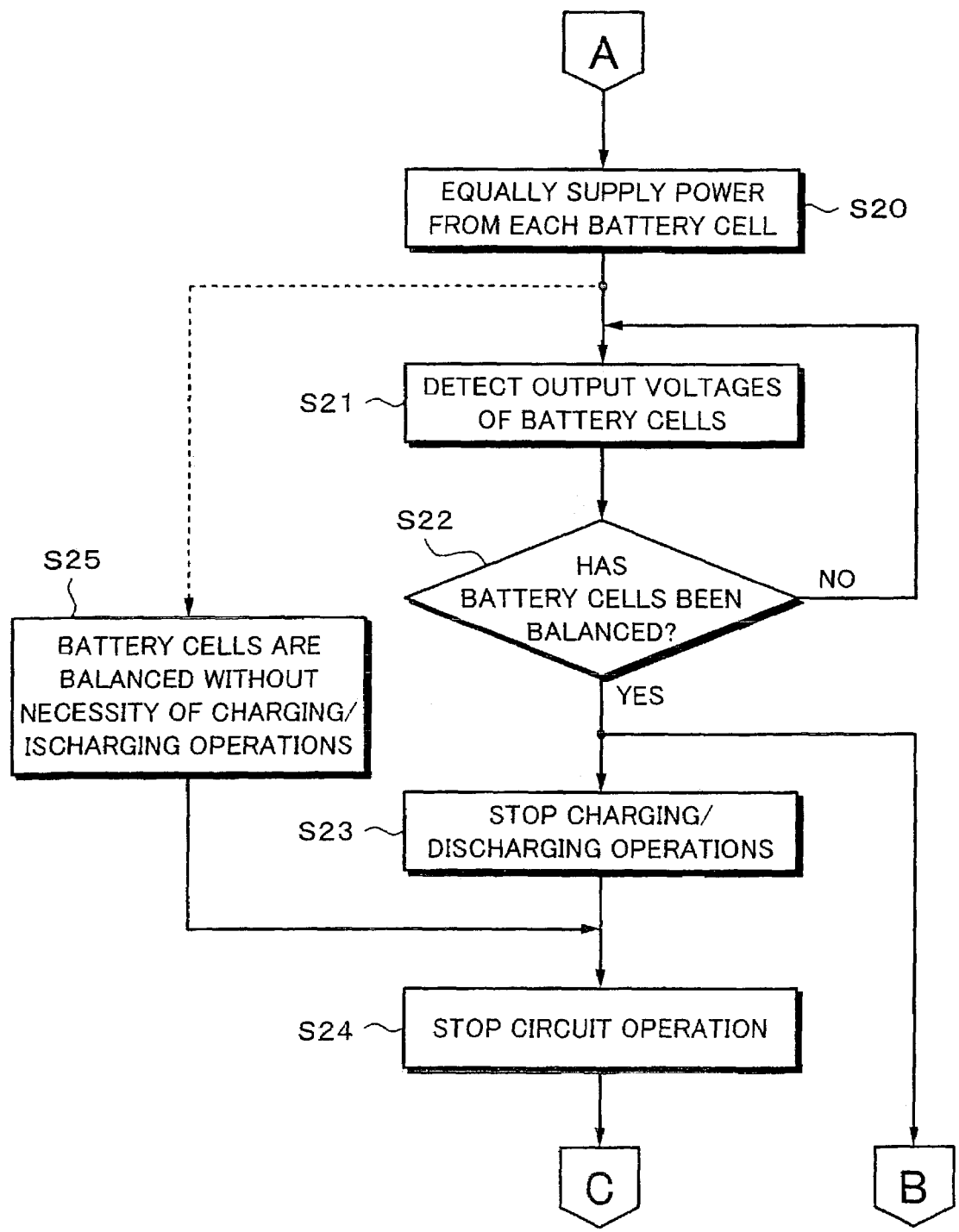
FIG. 15 is a flow chart showing the operation of the example of the structure for supplying the circuit power while detecting the output voltages of the secondary battery cells that are connected in series.
Figure 16:
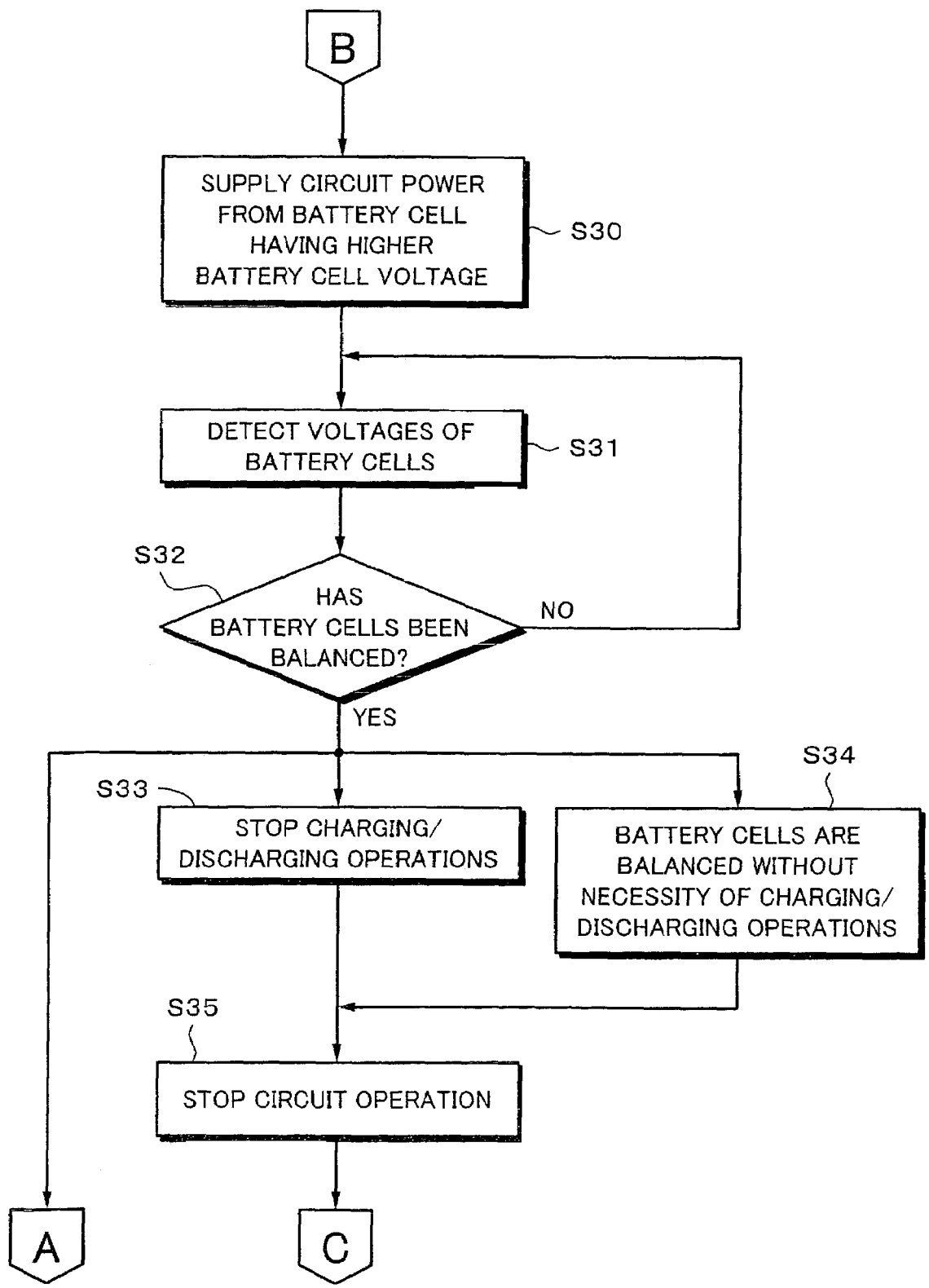
FIG. 16 is a flow chart showing the operation of the example of the structure for supplying the circuit power while detecting the output voltages of the secondary battery cells that are connected in series.

FIG. 14, FIG. 15, and FIG. 16 are flow charts for describing the operation of the structure shown in FIG. 13. In FIG. 14, FIG. 15, and FIG. 16, letters A, B, C represent that a flow advances to corresponding letters. Operations corresponding to the flow charts shown in FIG. 14, FIG. 15, and FIG. 16 are performed when the secondary battery cells E51 and E52 are charged or discharged. Alternatively, the operations may be performed when the secondary battery cells E51 and E52 are unbalanced.

In FIG. 14, before the processes of the flow charts are started, when it is determined whether or not battery cells are balanced, the voltage detecting circuit is operated for example at predetermined intervals. The voltage detecting circuit monitors the output voltages of the secondary battery cells E51 and E52. When the secondary battery cells E51 and E52 perform discharging and charging operations or the secondary battery cells E51 and E52 are largely unbalanced (at step S10), the voltage detecting circuit is operated. The voltage detecting circuit obtains the output voltages of the secondary battery cells E51 and E52 (at step S11). Corresponding to the obtained voltages, it is determined whether or not the secondary battery cells E51 and E52 are unbalanced (at step S12).

When the determined result represents that the secondary battery cells are balanced, the flow advances to step S20 shown in FIG. 15. At step S20, the circuit power 14 is equally supplied from the secondary battery cells E51 and E52. At that point, the circuit power supplying circuit alternately switches between the secondary battery cells E51 and E52 and causes the selected one to supply the circuit power 14.

When the circuit power 14 is supplied, at step S21, at step S21, the output voltages of the secondary battery cells E51 and E52 are detected. Corresponding to the detected output voltages, it is determined whether or not the secondary battery cells E51 and E52 are balanced.

When the determined result represents that the secondary battery cells are not balanced, as was described with reference to FIG. 9, a secondary battery cell that has a higher output voltage than the other is discharged. The secondary battery cell that has the higher output voltage charges the other secondary battery cell. In FIG. 13, for simplicity, the charging/discharging structure shown in FIG. 9 is omitted. After the secondary battery cells E51 and E52 have been charged and discharged, the flow returns to step S21. At step S21, it is determined whether or not the secondary battery cells E51 and E52 are balanced.

In contrast, when the determined result at step S22 represents that the secondary battery cells E51 and E52 are balanced, the flow advances to step S23. At step S23, the charging and discharging operations of the secondary battery cells E51 and E52 are stopped. Thereafter, the flow advances to step S24. At step S24, the circuit operation is stopped.

As denoted by a dotted line shown in FIG. 15, when the secondary battery cells E51 and E52 are balanced without necessity of the charging and discharging operations of the secondary battery cells E51 and E52 (at step S25), the flow advances to step S24. At step S24, the circuit operation is stopped. Thereafter, the flow returns to step S10 shown in FIG. 14. At step S10, the battery balance detecting operation and so forth are repeated.

When the determined result at step S12 represents that the output voltages of the secondary battery cells E51 and E52 are unbalanced, the flow advances to step S30 shown in FIG. 16. At step S30, a secondary battery cell that has a higher output voltage than the other supplies the circuit power 14. Thus, one of the secondary battery cells E51 and E52 that has a higher output voltage than the other is selected. In the method described with reference to FIG. 13, the circuit power 14 is supplied.

At step S31, the output voltages of the secondary battery cells E51 and E52 are detected. At step S32, it is determined whether or not the secondary battery cells are balanced.

When the secondary battery cells are not balanced, as was described with reference to FIG. 9, one of the secondary battery cells E51 and E52 that has a higher output voltage is discharged to the other secondary battery cell through a capacitor. After the secondary battery cells E51 and E52 have been charged and discharged, the flow returns to step S31. At step S31, the voltages of the secondary battery cells are detected.

In contrast, when the determined result at step S32 represents that the secondary battery cells are balanced, the flow advances to step S33. At step S33, the charging and discharging operations of the secondary battery cells E51 and E52 are stopped. At step S35, the circuit operation is stopped.

Thereafter, the flow returns to step S10 shown in FIG. 14. At step S10, the battery cell balance detecting operation and so forth are repeated.

When the flow has advanced to step S33, not returned to step S31, it is determined that secondary battery cells have been balanced without necessity of the charging and discharging operations (at step S34).

When the determined result at step S22 shown in FIG. 15 represents that the secondary battery cells are balanced, the flow advances to step S23 and step S30 shown in FIG. 16. On the other hand, when the determined result at step S32 shown in FIG. 16 represents that the secondary battery cells are balanced, the flow advances to step S33 and step S20 shown in FIG. 15.

(Fourth Embodiment)

Figure 1:
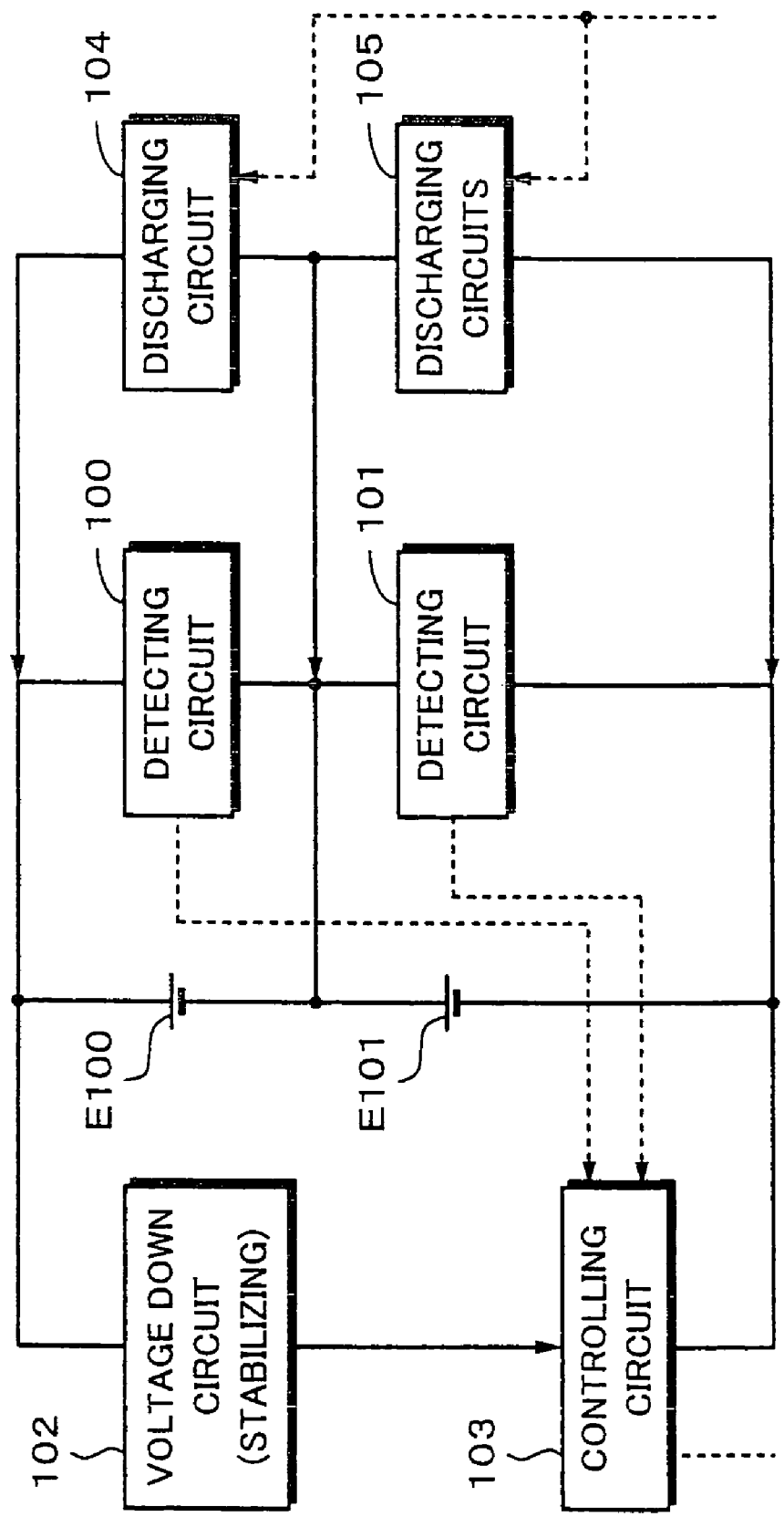
FIG. 1 is a block diagram showing an example of a structure for detecting voltages of secondary battery cells that are connected in series and balancing the secondary battery cells according to related art.
Figure 2:
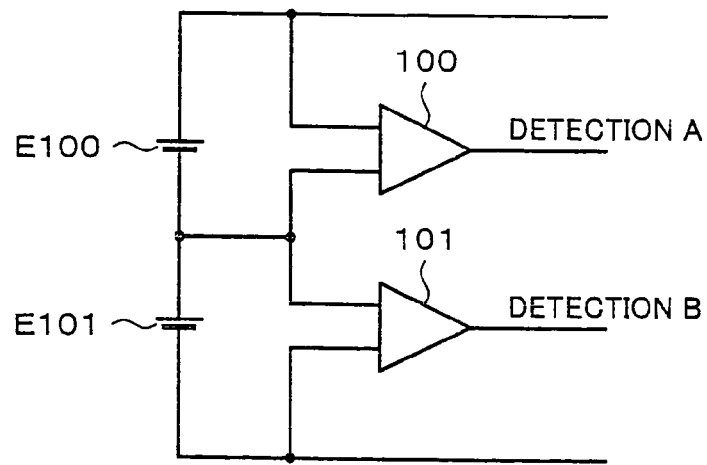
FIG. 2 is a schematic diagram for describing voltage detection of secondary battery cells according to related art.
Figure 3:
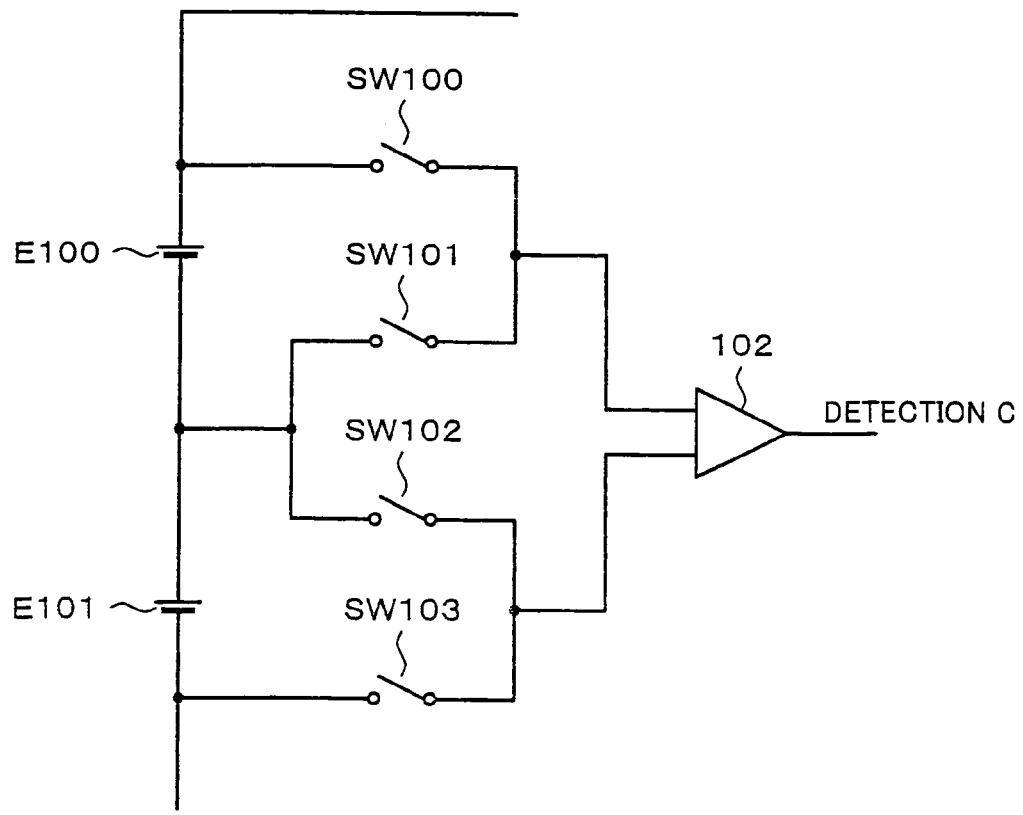
FIG. 3 is a schematic diagram for describing voltage detection according to related art.

Next, a fourth embodiment of the present invention will be described. According to the fourth embodiment of the present invention, when a plurality of secondary battery cells that are connected in series are balanced, a charger is used. FIG. 17 shows an example of a structure according to the forth embodiment. In the structure, secondary battery cells are balanced by the charger. In FIG. 17, for simplicity, a voltage detecting unit that detects output voltages of secondary battery cells E71 and E72 is omitted. As an example of the voltage detecting unit, the structure shown in FIG. 1 can be used.

A charger 20 charges a secondary battery cell E71 (having an output voltage V71) and a secondary battery cell E72 (having an output voltage V72) with an output of a power supply E73. A control terminal of the charger 20 is connected to a ground potential. An output terminal of the charger 20 is connected to a first terminal of a capacitor C71 through a switch SW77. A second terminal of the capacitor C71 is connected to a first terminal of a capacitor C72 through a switch SW78. A second terminal of the capacitor C72 is connected to the ground potential.

A connected point of the switch SW77 and the capacitor C71 is connected to first terminals of switches SW71, SW73, and SW75. A connected point of the capacitor C71 and the switch SW78 is connected to first terminals of switches SW72, SW74, and SW76. A second terminal of the switch SW76 is connected to the ground potential.

The secondary battery cells E71 and E72 are connected in series. A positive electrode of the secondary battery cell E71 is connected to a second terminal of the switch SW71. A connected point of the secondary battery cells E71 and E72 is connected to second terminals of the switches SW72 and SW73. A negative electrode of the secondary battery cell E72 is connected to a second terminal of the switch SW74.

In such a structure, only the switches SW77 and SW78 are turned on. As a result, the capacitors C71 and C72 are charged by the charger 20. With a delay of a predetermined time period ÄT, the switches SW77 and SW78 are turned off. When the detected results of the voltage detecting unit represent that V71<V72, the switches SW75 and SW76 and the switches SW71 and SW72 are turned on. As a result, the secondary battery cell E71 is charged with electric charges of the capacitor C72.

The output voltages of the secondary battery cells E71 and E72 are detected by the voltage detecting unit. When the secondary battery cells E71 and E72 are not balanced (namely, V71<V72), the switches SW71, SW72, SW75, and SW76 are turned off. The switches SW77 and SW78 are turned on. As a result, the capacitors C71 and C72 are charged. In the forgoing process, each switch is controlled. As a result, the secondary battery cell E71 is charged until the output voltages almost become V71=V72.

In other words, as exemplified in FIG. 18, while the output voltage V71 of the secondary battery cell E71 is lower than the output voltage V72 of the secondary battery cell E72, switching operations of the switches SW77 and SW78 and the switches SW71, SW72, SW75, and SW76 are repeated. When the voltage V71 becomes almost equal to the voltage V72, the switching operations are stopped. As a result, the charging operation is completed.

When the detected results of the voltage detecting unit represents that V71>V72, likewise, the secondary battery cell E72 is charged. In other words, only the switches SW77 are SW78 are turned on. The capacitors C71 and C72 are charged by the charger 20. With a delay of a predetermined time period ÄT, the switches SW77 and SW78 are turned off. The switches SW75 and SW76 and the switches SW73 and SW74 are turned on. As a result, the secondary battery cell E72 is charged with electric charges of the capacitor C72.

The output voltages of the secondary battery cells E71 and E72 are detected by the voltage detecting unit. When the detected results represent that the secondary battery cells E71 and E72 are not balanced (namely, V71>V72), the switches SW73, SW74, SW75, and SW76 are turned off. The switches SW77 and SW78 are turned on. As a result, the capacitors C71 and C72 are charged. In the forgoing process, each switch is controlled so that the secondary battery cell E72 is charged until the output voltages become almost V71=V72.

In the structure shown in FIG. 17, when the secondary battery cells E71 and E72 are charged by the power supply E73 with electric charges charged in the capacitors C71 and C72 through the charger 20, the secondary battery cells E71 and E72 may be balanced while they are being charged by the capacitors C71 and C72.

First, for example, only the switches SW77 and SW78 are turned on. As a result, the capacitors C71 and C72 are charged by the power supply E73 through the charger 20. The switches SW71 to SW76 are controlled so that with a delay of a predetermined time period ÄT, the switches SW77 and SW78 are turned off and that the secondary battery cell E71 and the secondary battery cells E72 are charged by the capacitors C71 and C72, respectively.

Fist, for example, only the switches SW71 and SW72 are turned on. As a result, the secondary battery cell E71 is charged by the capacitor C71. Next, the switches SW71 and SW72 are turned off. The switches SW73 and SW75 and the switches SW74 and SW75 are turned on. As a result, the secondary battery cell E72 is charged by the capacitor C72. After the capacitors C71 and C72 have been charged, only the switches SW77 and SW78 are turned on. As a result, the capacitors C71 and C72 are charged. Those operations are repeated until the secondary battery cells E71 and E72 are charged with predetermined electric charges.

At that point, when the capacitance of the capacitor C71 is equal to that of the capacitor C72, since the voltages of the capacitors C71 and C72 are balanced, the secondary battery cells E71 and E72 can be safely charged.

In the structure shown in FIG. 17, there is a period for which the power supply E73 can directly charge the capacitors C71 and C72. When the capacities of the secondary battery cells E71 and E72 are small and they are almost fully charged, with electric charges charged in the capacitors C71 and C72 through the charger 20, the secondary battery cells E71 and E72 are charged. When the secondary battery cell E71 is almost fully charged, the charging by the power supply E73 is stopped. The secondary battery cells E71 and E72 are charged by the capacitors C71 and C72 so that the secondary battery cell E71 is sufficiently charged instead of the charging by the power supply E73.

At that point, as denoted by a dotted line shown in FIG. 17, the output terminal of the charger 20 may be directly connected to the positive electrode of the secondary battery cell E71. Only the switches SW74 and SW76 are turned on. The negative electrode of the secondary battery cell E72 is connected to the ground potential. As a result, the secondary battery cells E71 and E72 can be directly charged by the power supply E73 and the charger 20.

FIG. 19 shows a modification of the structure shown in FIG. 17. In the structure shown in FIG. 19, the charger 20 is controlled so that the secondary battery cells E71 and E72 are balanced. In FIG. 19, similar portions to those in FIG. 17 will be denoted by similar reference numerals and their description will be omitted.

In FIG. 19, a battery cell voltage detector 22 is disposed in the structure shown in FIG. 17. The battery cell voltage detector 22 can detect the output voltages of the secondary battery cells E71 and E72. The detected results of the battery cell voltage detector 22 are supplied as a control signal to the charger 20. The battery cell voltage detector 22 detects the output voltages of the secondary battery cells E71 and E72 that are connected in series. Corresponding to the detected results, the battery cell voltage detector 22 controls the charger 20 in such a manner that it charges one of the secondary battery cells connected in series that has a lower output voltage than the other so that the voltage of the first secondary battery cell becomes almost equal to the second secondary battery cells.

In the same manner as that of the example shown in FIG. 17, corresponding to a secondary battery cell charged by the charger 20, the on/off states of the switches SW71 to SW78 are controlled. When the capacitors C71 and C72 are charged by the charger 20, the switches SW80, SW77, and SW78 are turned on.

In that case, the output voltage of the charger 20 is different from a voltage at which the secondary battery cells E71 and E72, which are connected in series and charged, are balanced. Thus, in FIG. 19, another charger 21 is disposed. As denoted by a dotted line in FIG. 19, an output terminal of the charger 21 can be connected to the positive electrode of the secondary battery cell E71. When the switches SW71, SW72, SW73, SW74, and SW80 are turned off, the charger 21 causes the power supply E73 to charge the secondary battery cells E71 and E72 in series.

In the forgoing structure according to the first embodiment shown in FIG. 4, electric charges of the secondary battery cell E1 or E2 are temporarily charged to the capacitor C1. The electric charges stored in the capacitor C1 are moved to the capacitor C2. Thereafter, the potential of the capacitor C2 is detected. As a result, the voltage of the secondary battery cell E1 or E2 is detected. The present invention is not limited to such a structure. Alternatively, without the capacitor C2 in the structure shown in FIG. 4, the voltages of the secondary battery cell E1 or E2 can be detected.

FIG. 20 shows an example of a structure according to another modification of the first embodiment of the present invention. In the structure according to the other modification of the first embodiment, the capacitor C2 is omitted from the structure shown in FIG. 4. In FIG. 20, similar portions to those in FIG. 4 will be denoted by similar reference numerals and their description will be omitted.

In the structure shown in FIG. 20, when the output voltage of the secondary battery cell E1 is obtained, first, the switches SW1 and SW2 are turned on. The other switches SW3 to SW6 are turned off. After the capacitor C1 has been charged by the secondary battery cell E1, the switches SW1 and SW2 are turned off. The switches SW3 and SW4 are turned on. The potential of the capacitor C1 is detected by the battery cell voltage detecting-circuit power supply portion 10. The detected potential of the capacitor C1 corresponds to the output voltage of the secondary battery cell E1. After the potential of the capacitor C1 has been detected, the capacitor C1 is discharged by for example the battery cell voltage detecting-circuit power supply portion 10.

When the output voltage of the secondary battery cell E2 is obtained, first, the switches SW6 and SW3 are turned on. The other switches SW1, SW2, SW4, and SW5 are turned off. As a result, the capacitor C1 is charged by the secondary battery cell E2. After the capacitor C1 has been charged by the secondary battery cell E2, the switches SW6 and SW3 are turned off. The switches SW3 and SW4 are turned on. The potential of the capacitor C1 is detected by the battery cell voltage detecting-circuit power supply portion 10. The detected potential of the capacitor C1 corresponds to the output voltage of the secondary battery cell E2. After the potential of the capacitor C1 has been detected, the capacitor C1 is discharged by the battery cell voltage detecting-circuit power supply portion 10.

In the example shown in FIG. 20, when the potential of the capacitor C1 is detected by the battery cell voltage detecting-circuit power supply portion 10, since one terminal of the capacitor C1 is connected to the ground potential, the potential of the capacitor C1 can be stably detected.

In the structure shown in FIG. 20, as was described in the third embodiment, it is difficult to supply a circuit power with the secondary battery cell E1 and E2 through a capacitor.

As was described above, according to a first aspect (the first embodiment) of the present invention, output voltages of secondary battery cells that are connected in series are detected by one detecting circuit. Thus, fluctuations of detected output voltages of the secondary battery cells connected in series can be suppressed.

In addition, according to a second aspect (second embodiment) of the present invention, when secondary battery cells connected in series are unbalanced, one secondary battery cell that has a lower output voltage is charged by another secondary battery cells that has a higher output voltage. As a result, the secondary battery cells are balanced. Thus, losses of capacities of the secondary battery cells can be suppressed. In addition, the secondary battery cells can be quickly balanced.

In addition, according to a third aspect (third embodiment) of the present invention, output voltages of secondary battery cells that are connected in series are detected. Corresponding to the detected results, a circuit power for a voltage detecting circuit, a switching controlling circuit, and so forth is supplied from one of the secondary battery cells that has a higher output voltage than other. Thus, while losses of the secondary battery cells are suppressed, the circuit power can be supplied.

At that point, while a circuit power is supplied, secondary battery cells can be balanced.

In addition, according to a fourth aspect (fourth embodiment) of the present invention, when secondary battery cells that are connected in series are charged, their output voltages are detected. Corresponding to the detected results, one of the secondary battery cells that has a lower output voltage is charged so that the voltage becomes equal to the output voltage of another secondary battery cell that has a higher output voltage. Thus, while the secondary battery cells connected in series are balanced, they can be charged.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An apparatus for connecting a first secondary battery cell and a second secondary battery cell in series, comprising:
    first connecting means for connecting the first secondary battery cell and a first capacitor in parallel, a first electrode of the first secondary battery cell not being connected to a ground potential; and
    second connecting means for connecting the first capacitor and a second capacitor in parallel, a first terminal of the second capacitor being connected to the ground potential,
    wherein the first connecting means connects the first secondary battery cell and the first capacitor in parallel such that the first secondary battery cell charges the first capacitor, the first secondary battery cell is then disconnected from the first capacitor while the second connecting means connects the first capacitor and the second capacitor in parallel to move electric charges from the first capacitor to the second capacitor, the potential of the second capacitor is then detected as the output voltage of the first secondary battery cell, and the second capacitor is discharged,
    wherein the second capacitor is subsequently charged and the potential of the second capacitor is detected as the output voltage of the second secondary battery cell,
    wherein the detections of the potential of the second capacitor corresponding to the first secondary battery cell and the second secondary battery cell provide a lower detected output voltage and a higher detected output voltage, and wherein one of the first secondary battery cell and the second secondary battery cell that has the lower detected output voltage than the other secondary battery cell is charged to the higher detected output voltage balance the voltage of the first secondary battery cell and the second secondary battery cell.

2. The apparatus as set forth in claim 1, wherein after the first secondary battery cell and the first capacitor have been connected in parallel by the first connecting means and the first capacitor has been connected by the first secondary battery cell, the first secondary battery cell is disconnected from the first capacitor, the first capacitor and the second capacitor are connected in parallel by the second connecting means, and an operation for moving electric charges charged in the first capacitor to the second capacitor is repeated until the output voltage of the first secondary battery cell becomes almost equal to a potential of the second capacitor.

3. The apparatus as set forth in claim 1, further comprising:

third connecting means for connecting the second secondary battery cell and the second capacitor, a first electrode of the second secondary battery cell being connected to the ground potential.

4. The apparatus as set forth in claim 1, wherein the first secondary battery cell and the second secondary battery cell are charged with the voltage taken out of the second capacitor so that an output voltage of the first secondary battery cell becomes almost equal to an output voltage of the second secondary battery cell.

5. The apparatus as set forth in claim 1, wherein the voltage taken out of the second capacitor is used as a power voltage.

6. The apparatus as set forth in claim 5, wherein the voltage taken out of the second capacitor is used as the power voltage corresponding to one of the first secondary battery cell and the second secondary battery cell that has a higher output voltage than the other.

7. The apparatus as set forth in claim 1, wherein a third connecting means then connects the second secondary battery cell and the first capacitor in parallel such that the second secondary battery cell charges the first capacitor, the second secondary battery cell is then disconnected from the first capacitor while the second connecting means connects the first capacitor and the second capacitor in parallel to move electric charges from the first capacitor to the second capacitor, and the potential of the second capacitor is then detected as the output voltage of the second secondary battery cell.

* * * * *